United States Patent
Luo et al.

(10) Patent No.: US 11,343,856 B2
(45) Date of Patent: May 24, 2022

(54) COMMUNICATION METHOD AND APPARATUS

(71) Applicant: HUAWEI TECHNOLOGIES CO., LTD., Guangdong (CN)

(72) Inventors: Zhihu Luo, Beijing (CN); Zhe Jin, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 16/875,203

(22) Filed: May 15, 2020

(65) Prior Publication Data
US 2020/0281024 A1 Sep. 3, 2020

Related U.S. Application Data

(63) Continuation of application No. PCT/CN2017/111739, filed on Nov. 17, 2017.

(51) Int. Cl.
*H04W 74/08* (2009.01)
*H04B 1/713* (2011.01)
(Continued)

(52) U.S. Cl.
CPC ........ *H04W 74/0833* (2013.01); *H04B 1/713* (2013.01); *H04W 72/042* (2013.01); *H04W 72/0446* (2013.01); *H04W 74/002* (2013.01)

(58) Field of Classification Search
CPC ........... H04W 74/0833; H04W 72/042; H04W 72/0446; H04W 74/002; H04W 74/004;
(Continued)

(56) References Cited

U.S. PATENT DOCUMENTS

| 2011/0045837 A1* | 2/2011 | Kim ................. | H04W 74/0833 455/452.1 |
| 2013/0070726 A1* | 3/2013 | Zhang ............... | H04W 56/0035 370/331 |

(Continued)

FOREIGN PATENT DOCUMENTS

| CN | 104184548 A | 12/2014 |
| CN | 106465428 A | 2/2017 |

(Continued)

OTHER PUBLICATIONS

X. Lin, A. Adhikary and Y.-. Eric Wang, "Random Access Preamble Design and Detection for 3GPP Narrowband IoT Systems," in IEEE Wireless Communications Letters, vol. 5, No. 6, pp. 640-643, Dec. 2016, doi: 10.1109/LWC.2016.2609914. (Year: 2016).*

(Continued)

*Primary Examiner* — Phirin Sam
*Assistant Examiner* — Tarell A Hampton
(74) *Attorney, Agent, or Firm* — Fish & Richardson P.C.

(57) ABSTRACT

A communication method includes: determining a preamble including M symbol groups; and sending the M symbol groups in K uplink subframe sets, where any uplink subframe set in the K uplink subframe sets includes one uplink subframe or more than one consecutive uplink subframes, any two uplink subframe sets in the K uplink subframe sets are spaced by at least one downlink subframe, and in each of the K uplink subframe sets at least one symbol group can be sent; N times of frequency hopping exist in the M symbol groups, each of the N times of frequency hopping is frequency hopping between adjacent symbol groups in the M symbol groups, and frequency hopping directions of at least two of the N times of frequency hopping are opposite, N is less than M, K is less than or equal to M, and K, N and M are positive integers.

8 Claims, 11 Drawing Sheets

(51) Int. Cl.
*H04W 72/04* (2009.01)
*H04W 74/00* (2009.01)

(58) Field of Classification Search
CPC ..... H04B 1/713; H04L 5/0064; H04L 5/1469; H04L 5/0094; H04L 5/0053; H04L 5/001
See application file for complete search history.

(56) References Cited

U.S. PATENT DOCUMENTS

| | | | |
|---|---|---|---|
| 2015/0365977 A1 | 12/2015 | Tabet et al. | |
| 2018/0248671 A1* | 8/2018 | Bhattad | H04L 1/0068 |
| 2018/0317263 A1* | 11/2018 | Ishii | H04W 74/0833 |
| 2019/0274168 A1* | 9/2019 | Hwang | H04W 74/004 |
| 2020/0178296 A1* | 6/2020 | Shin | H04L 5/1469 |
| 2020/0236524 A1* | 7/2020 | Ye | H04L 5/0094 |

FOREIGN PATENT DOCUMENTS

| | | | | |
|---|---|---|---|---|
| RU | 2407155 C2 | 12/2010 | | |
| WO | 2015065768 A1 | 5/2015 | | |
| WO | 2017167309 A1 | 10/2017 | | |
| WO | WO-2018026199 A1 * | 2/2018 | ........... | H04L 5/0053 |
| WO | WO-2019031834 A1 * | 2/2019 | ............. | H04L 5/001 |
| WO | WO-2019066705 A1 * | 4/2019 | ........ | H04W 74/0833 |

OTHER PUBLICATIONS

Ericcson, "Narrowband LTE—Random access design," R1-156011,3GPP TSG-RAN1 #82bis, Stockholm, Sweden, Oct. 2015. (Year: 2015).*
"NB-IoT—Single tone frequency hopping NB-PRACH design," R1-160275, 3GPP TSG-RAN1 #84, Ericsson, Stockholm, Sweden, Feb. 2016. (Year: 2016).*
Office Action issued in Russian Application No. 2020119799/07(033588) dated Feb. 24, 2021, 37 pages (machine translation).
Extended European Search Report issued in European Application No. 17932143.5 dated Oct. 26, 2020, 11 pages.
Huawei et al., "On uplink TDD NB-IoT," 3GPP TSG RAN WG1 Meeting #90bis, R1-1716983, Prague, Czech Republic, Oct. 9-13, 2017, 3 pages.
LG Electronics, "Discussion on TDD for NB-IoT in uplink aspects," 3GPP TSG RAN WG1 Meeting #90bis, R1-1717281, Prague, Czech Republic, Oct. 9-13, 2017, 7 pages.
Ericsson, "On the UL of NB-IoT TDD," 3GPP TSG-RAN WG1 Meeting #90bis, R1-1717022, Prague, Czech Republic, Oct. 9-13, 2017, 14 pages.
Office Action issued in Chinese Application No. 201780096686.0 dated Jun. 29, 2021, 9 pages.
Qualcomm Incorporated, "Uplink aspects of TDD," 3GPP TSG-RAN WG1 #90, R1-1712815, Prague, Czechia, Aug. 21-25, 2017, 4 pages.
ZTE, Sanechips, "Detailed design on uplink aspects to support TDD NB-IoT," 3GPP TSG RAN WG1 Meeting #90bis, R1-1717203, Prague, Czechia, Oct. 9-13, 2017, 11 pages.
Office Action issued in Indian Application No. 202037021774 dated Jun. 10, 2021, 5 pages.
ZTE,"Considerations on uplink aspects to support TDD NB-IoT",3GPP TSG RAN WG1 Meeting #90, R1-1713012, Prague, Czechia, Aug. 21-25, 2017, 5 pages.
Huawei et al.,"On uplink TDD NB-IoT",3GPP TSG RAN WG1 Meeting #90, R1-1713366,Prague, Czech Republic, Aug. 21-25, 2017, 2 pages.
Intel Corporation,"Discussion on the UL aspects for TDD support in feNB-IoT",3GPP TSG RAN WG1 Meeting #90bis, R1-1717348,Prague, Czech Republic, Oct. 9-13, 2017, 4 pages.
3GPP TS 36.211 V14.4.0 (Sep. 2017),3rd Generation Partnership Project,Technical Specification Group Radio Access Network,Evolved Universal Terrestrial Radio Access (E-UTRA),Physical channels and modulation(Release 14), 198 pages.
PCT International Search Report and Written Opinion in International Application No. PCT/CN2017/111,739, dated Jul. 31, 2018, 10 pages (With English Translation).

* cited by examiner

COMMUNICATION METHOD AND APPARATUS

CROSS-REFERENCE TO RELATED APPLICATIONS

This application is a continuation of International Application No. PCT/CN2017/111739, filed on Nov. 17, 2017, the disclosure of which is hereby incorporated by reference in its entirety.

TECHNICAL FIELD

This application relates to the field of wireless communications technologies, and in particular, to a communication method and apparatus.

BACKGROUND

A mobile communications standards organization, that is, the 3rd generation partnership project (3GPP), proposes a narrowband internet of things (NB-IoT) technology. Similar to a technology in long term evolution (LTE) system, an NB-IoT technology is classified into time division duplex (TDD) NB-IoT and frequency division duplex (FDD) NB-IoT. In the NB-IoT technology, a terminal device needs to access a base station in a random access manner. In NB-IoT, the terminal device needs to send a random access preamble on a narrowband physical random access channel (NPRACH). In FDD NB-IoT, one preamble includes four symbol groups, and a time length occupied by each symbol group is 1.4 ms or 1.6 ms. In other words, a time length of continuous uplink resources occupied by one preamble is 5.6 ms or 6.4 ms. However, for TDD NB-IoT in which an in-band mode is used for deployment, continuous uplink resources included in one radio frame have at most three subframes, and a time length of one subframe is 1 ms. Therefore, the terminal device cannot send a preamble whose time length is 5.6 ms or 6.4 ms in the three subframes. Consequently, the terminal device cannot access a base station.

In conclusion, in TDD NB-IoT, how a communications device, for example, a device such as a terminal device, that needs to access a base station sends a preamble to the base station is a problem to be resolved urgently.

SUMMARY

An objective of implementations of this application is to provide a communication method and apparatus, to resolve a problem of how a communications device including a terminal device sends a preamble in a TDD manner.

An embodiment of this application provides a communication method, including:

determining, by a terminal device, a preamble, where the preamble includes M symbol groups, where M is a positive integer greater than 1; and sending, by the terminal device, the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

According to the foregoing method, the terminal sends the M symbol groups in the preamble in the K uplink subframe sets. Because the any two of the K uplink subframe sets are spaced by the at least one downlink subframe, the terminal may send the preamble in a plurality of non-consecutive uplink subframes in one radio frame, to implement sending of the preamble in discontinuous uplink resources in time domain. This improves resource utilization while resolving a problem that a terminal device cannot send a preamble in TDD NB-IoT. Because frequency hopping directions of at least two of the N times of frequency hopping are opposite, phase impact caused by a frequency offset can be eliminated, thereby improving reliability of timing advance estimation performed by the network device on the terminal based on a received preamble.

Optionally, M is equal to 6.

K is equal to 2, and the terminal device sends three symbol groups in each of the two uplink subframe sets.

Optionally, the K uplink subframe sets include a first uplink subframe set and a second uplink subframe set; and the sending, by the terminal device, the M symbol groups in K uplink subframe sets includes:

sending, by the terminal device, a first symbol group, a second symbol group, and a third symbol group in the M symbol groups in the first uplink subframe set; and sending, by the terminal device, a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and the terminal device sends two symbol groups in each of the two uplink subframe sets.

Optionally, the K uplink subframe sets include a first uplink subframe set and a second uplink subframe set; and the sending, by the terminal device, the M symbol groups in the preamble in K uplink subframe sets includes:

sending, by the terminal device, a first symbol group and a second symbol group in the M symbol groups in the first uplink subframe set; and sending, by the terminal device, a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

Optionally, before the determining, by a terminal device, a preamble, the method further includes:

receiving, by the terminal device, a random access configuration parameter sent by a network device, where the random access configuration parameter includes preamble format information.

The preamble format information indicates at least one or more of the following:

the number of symbol groups included in the preamble;
the number of symbols included in each symbol group;
a time length of a cyclic prefix (CP) in each symbol group;
the number of consecutive subcarriers occupied by each symbol group; and
a frequency hopping rule of the preamble.

An embodiment of this application provides a communication method, including:

receiving, by a network device, a preamble sent by a terminal device in K uplink subframe sets, where the preamble includes M symbol groups; any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, M is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M; and performing, by the network device, uplink synchronization measurement based on the preamble.

According to the foregoing method, the preamble received by the network device is sent by the terminal in the K uplink subframe sets. Because the any two of the K uplink subframe sets are spaced by the at least one downlink subframe, the terminal may send the preamble in a plurality of non-consecutive uplink subframes in one radio frame, to implement sending of the preamble in discontinuous uplink resources in time domain. This improves resource utilization while resolving a problem that a terminal device cannot send a preamble in TDD NB-IoT. Because frequency hopping directions of at least two of the N times of frequency hopping are opposite, phase impact caused by a frequency offset can be eliminated, thereby improving reliability of timing advance estimation performed by the network device on the terminal based on a received preamble.

Optionally, M is equal to 6.

K is equal to 2, and each of the two uplink subframe sets is used to send three symbol groups.

Optionally, the receiving, by a network device, a preamble sent by a terminal device in K uplink subframe sets includes:

receiving, by the network device, a first symbol group, a second symbol group, and a third symbol group in the M symbol groups in the first uplink subframe set; and receiving a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set; and the receiving, by a network device, a preamble sent by a terminal device in K uplink subframe sets includes:

receiving a first symbol group and a second symbol group in the M symbol groups in the first uplink subframe set; and receiving a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

Optionally, the method further includes:

sending, by the network device, a random access configuration parameter to the terminal device, where the random access configuration parameter includes preamble format information.

The preamble format information indicates at least one or more of the following:

the number of symbol groups included in the preamble:
the number of symbols included in each symbol group;
a time length of a cyclic prefix in each symbol group;
the number of consecutive subcarriers occupied by each symbol group; and
a frequency hopping rule of the preamble.

An embodiment of this application provides a communication method, including:

determining, by a terminal device, a preamble, where the preamble includes M symbol groups, where M is a positive integer greater than 1; and sending, by the terminal device, the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 0, and K is less than or equal to M; and each of the M symbol groups occupies two consecutive subcarriers.

According to the foregoing method, the terminal sends the M symbol groups in the preamble in the K uplink subframe sets, and each symbol group occupies two consecutive subcarriers, so that a length of the preamble can be shortened, and the preamble can be sent in the K uplink subframe sets. In addition, because the any two of the K uplink subframe sets are spaced by the at least one downlink subframe, the terminal may send the preamble in a plurality of non-consecutive uplink subframes in one radio frame, to implement sending of the preamble in discontinuous uplink resources in time domain. This improves resource utilization while resolving a problem that a terminal device cannot send a preamble in TDD NB-IoT.

Optionally, N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

In the foregoing solution, because frequency hopping directions of at least two times of frequency hopping are opposite in the symbol groups in which the N times of frequency hopping are performed, phase impact caused by a frequency offset can be eliminated, thereby improving reliability of timing advance estimation performed by the network device on the terminal based on a received preamble.

Optionally, K is equal to 1, and M is equal to 3; and
the sending, by the terminal device, the M symbol groups in K uplink subframe sets includes:
sending, by the terminal device, a first symbol group, a second symbol group, and a third symbol group in the M symbol groups in one uplink subframe set, where
a frequency hopping direction between the first symbol group and the second symbol group is opposite to a frequency hopping direction between the second symbol group and the third symbol group; and a frequency hopping interval between the first symbol group and the second symbol group is the same as a frequency hopping interval between the second symbol group and the third symbol group.

Optionally, K is equal to 1, and M is equal to 2; and
the sending, by the terminal device, the M symbol groups in K uplink subframe sets includes:
sending, by the terminal device, a first symbol group and a second symbol group in the M symbol groups in one uplink subframe set, where
a frequency hopping interval between the first symbol group and the second symbol group is a width of E/2 subcarrier spacings, where E is the number of subcarriers included in a frequency hopping range, and E is agreed on in a protocol.

Optionally, K is equal to 2, and M is equal to 2; and
the sending, by the terminal device, the M symbol groups in K uplink subframe sets includes:
sending, by the terminal device, a first symbol group in the M symbol groups in a first uplink subframe set in the two uplink subframe sets; and sending, by the terminal device, a second symbol group in the M symbol groups in a second uplink subframe set in the two uplink subframe sets, where
a frequency hopping interval between the first symbol group and the second symbol group is a width of E/2 subcarrier spacings, where E is the number of subcarriers included in a frequency hopping range, and E is agreed on in a protocol.

Optionally, N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Optionally, before the determining, by a terminal device, a preamble, the method further includes:
receiving, by the terminal device, a random access configuration parameter sent by a network device, where the random access configuration parameter includes preamble format information.

The preamble format information indicates at least one or more of the following:
the number of symbol groups included in the preamble:
the number of symbols included in each symbol group;
a time length of a cyclic prefix in each symbol group;
the number of consecutive subcarriers occupied by each symbol group; and
a frequency hopping rule of the preamble.

An embodiment of this application provides a communications device, including a processing unit and a transceiver unit.

The processing unit is configured to determine a preamble, where the preamble includes M symbol groups, where M is a positive integer greater than 1.

The transceiver unit is configured to send the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Optionally, M is equal to 6.
K is equal to 2, and each of the two uplink subframe sets is used to send three symbol groups.

Optionally, the K uplink subframe sets include a first uplink subframe set and a second uplink subframe set.

The transceiver unit is specifically configured to:
send a first symbol group, a second symbol group, and a third symbol group in the M symbol groups in the first uplink subframe set; and
send a fourth symbol group, a fifth symbol group, and a sixth symbol group in the M symbol groups in the second uplink subframe set, where
a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver unit is specifically configured to:

send a first symbol group and a second symbol group in the M symbol groups in the first uplink subframe set; and send a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

Optionally, the transceiver unit is further configured to:

receive a random access configuration parameter sent by a network device, where the random access configuration parameter includes preamble format information.

The preamble format information indicates at least one or more of the following:

the number of symbol groups included in the preamble;
the number of symbols included in each symbol group:
a time length of a cyclic prefix (CP) in each symbol group;
the number of consecutive subcarriers occupied by each symbol group; and
a frequency hopping rule of the preamble.

An embodiment of this application provides a communications device, including a processing unit and a transceiver unit.

The transceiver unit is configured to receive a preamble sent by a terminal device in K uplink subframe sets, where the preamble includes M symbol groups; any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, M is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

The processing unit is configured to perform uplink synchronization measurement based on the preamble.

Optionally, M is equal to 6.

K is equal to 2, and each of the two uplink subframe sets is used to send three symbol groups.

Optionally, the transceiver unit is specifically configured to:

receive a first symbol group, a second symbol group, and a third symbol group in the M symbol groups in a first uplink subframe set; and receive a fourth symbol group, a fifth symbol group, and a sixth symbol group in the M symbol groups in a second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver unit is specifically configured to:

receive a first symbol group and a second symbol group in the M symbol groups in the first uplink subframe set; and receive a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

An embodiment of this application provides a communications device, including a processor and a transceiver.

The processor is configured to determine a preamble, where the preamble includes M symbol groups, where M is a positive integer greater than 1.

The transceiver is configured to send the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Optionally, M is equal to 6.

K is equal to 2, and each of the two uplink subframe sets is used to send three symbol groups.

Optionally, the K uplink subframe sets include a first uplink subframe set and a second uplink subframe set.

The transceiver is specifically configured to:

send a first symbol group, a second symbol group, and a third symbol group in the M symbol groups in the first uplink subframe set; and send a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver is specifically configured to:

send a first symbol group and a second symbol group in the M symbol groups in the first uplink subframe set; and send a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

Optionally, the transceiver is further configured to:

receive a random access configuration parameter sent by a network device, where the random access configuration parameter includes preamble format information.

The preamble format information indicates at least one or more of the following:

the number of symbol groups included in the preamble;
the number of symbols included in each symbol group;
a time length of a cyclic prefix (CP) in each symbol group;
the number of consecutive subcarriers occupied by each symbol group; and
a frequency hopping rule of the preamble.

An embodiment of this application provides a communications device, including a processor and a communications interface.

The communications interface is configured to receive a preamble sent by a terminal device in K uplink subframe sets, where the preamble includes M symbol groups; any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, M is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

The processor is configured to perform uplink synchronization measurement based on the preamble.

Optionally, M is equal to 6.

K is equal to 2, and each of the two uplink subframe sets is used to send three symbol groups.

Optionally, the communications interface is specifically configured to:

receive a first symbol group, a second symbol group, and a third symbol group in the M symbol groups in a first uplink subframe set; and receive a fourth symbol group, a fifth symbol group, and a sixth symbol group in the M symbol groups in a second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The communications interface is specifically configured to:

receive a first symbol group and a second symbol group in the M symbol groups in the first uplink subframe set; and receive a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Optionally, each of the M symbol groups occupies one subcarrier.

This application further provides a communications device, including a memory and a processor, where the memory is configured to store an instruction, the processor is configured to execute the instruction stored in the memory, and when executing the instruction stored in the memory, the processor is configured to perform any one of the foregoing communication methods.

An embodiment of this application further provides a computer-readable storage medium, storing a computer readable instruction, where when the computer readable instruction is read and executed by a communications device, the communications device is enabled to perform any one of the foregoing communication methods.

An embodiment of this application further provides a computer program product, including a computer readable instruction, where when the computer readable instruction is read and executed by a communications device, the communications device is enabled to perform any one of the foregoing communication methods.

An embodiment of this application further provides a communications system. The system includes the terminal device or the network device provided in any one of the foregoing designs. Optionally, the system may further include another device that interacts with the terminal device or the network device in the solutions provided in the embodiments of this application.

DESCRIPTION OF EMBODIMENTS

The following further describes in detail the embodiments of this application with reference to accompanying drawings.

The embodiments of this application may be applied to various mobile communications systems, such as: a new radio (NR) system, a global system for mobile communications (GSM), a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunications system (UMTS), an evolved long term evolution (eLTE) system, and other mobile communications systems.

Figure 1:
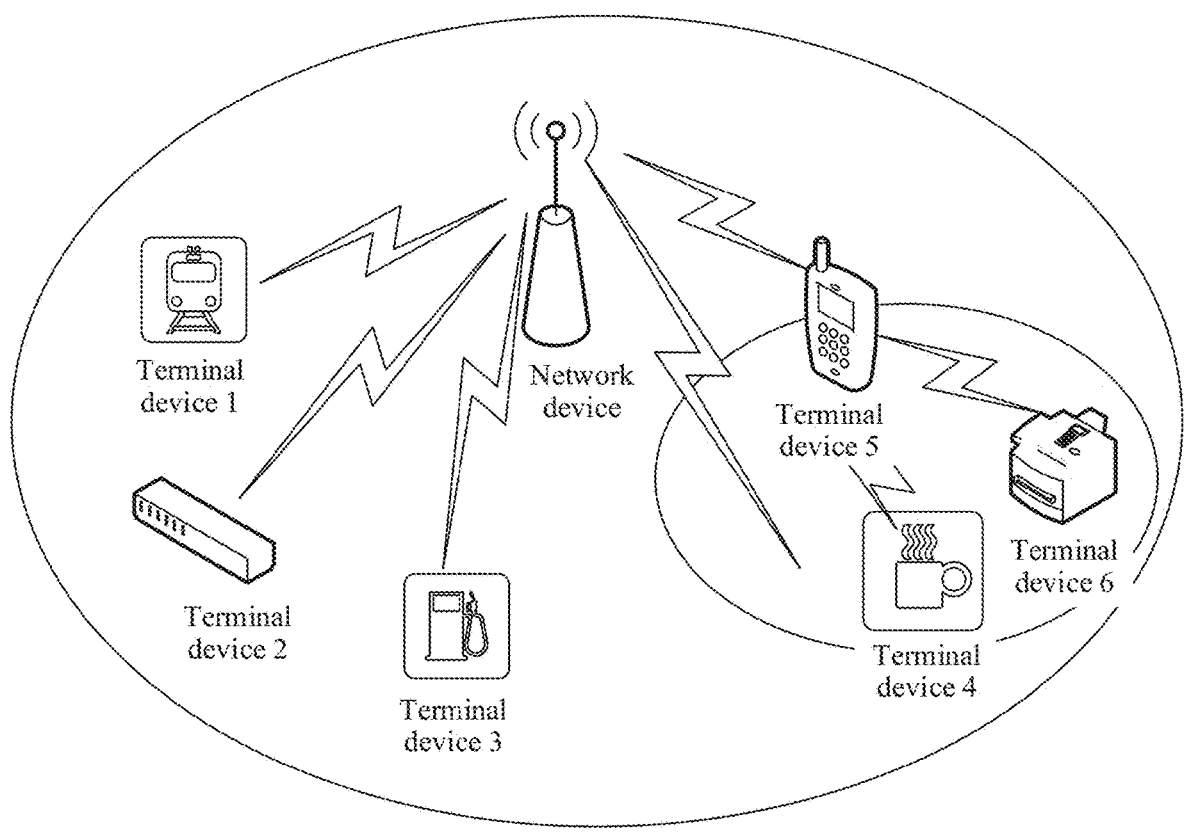
FIG. 1 is a schematic diagram of a system architecture applicable to the embodiments of this application.

FIG. 1 is an example of a schematic diagram of a system architecture applicable to the embodiments of this application. As shown in FIG. 1, a network device and terminal devices 1 to 6 constitute a communications system. In the communications system, the network device sends information to one or more of the terminal devices 1 to 6. In addition, the terminal devices 4 to 6 also constitute a communications system. In the communications system, the terminal device 5 may send information to one or both of the terminal device 4 and the terminal device 6.

In the embodiments of this application, the terminal device may support an NB-IoT technology, and may be user equipment (UE), an access terminal device, a subscriber unit, a subscriber station, a mobile station, a mobile console, a remote station, a remote terminal device, a mobile device, a wireless communications device, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like.

The network device may be referred to as a radio access network (RAN) device, and is collectively referred to as a network device below. The network device is mainly responsible for providing a wireless connection for a terminal device, to ensure reliable transmission of uplink and downlink data of the terminal device and the like. The network device may be a gNB (generation NodeB) in a 5G system, or may be a base transceiver station (BTS) in a global system for mobile communications (GSM) system or code division multiple access (CDMA), or may be a NodeB (NB) in a wideband code division multiple access (WCDMA) system, or may be an evolved NodeB (eNB, or eNodeB) in a long term evolution (LTE) system, or the like.

Figure 2:
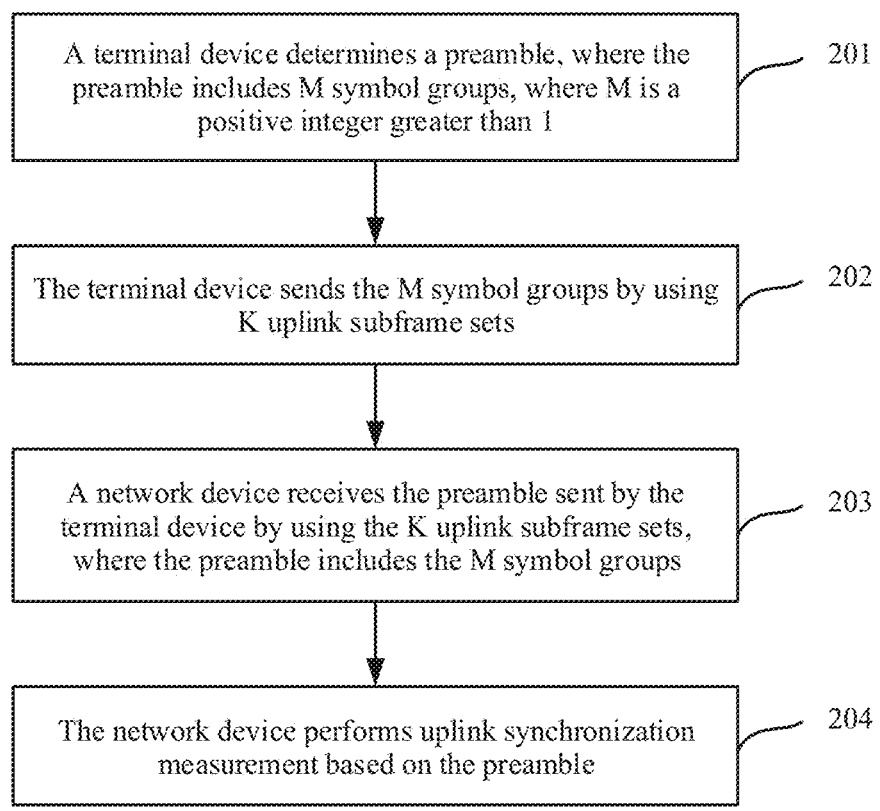
FIG. 2 is a schematic flowchart of a communication method according to an embodiment of this application.

With reference to the foregoing description, FIG. 2 is a schematic flowchart of a communication method according to an embodiment of this application. Referring to FIG. 2, the method includes the following steps.

Step 201: A terminal device determines a preamble, where the preamble includes M symbol groups, where M is a positive integer greater than 1.

In the embodiments of this application, the terminal device may be a TDD terminal device, which may be referred to as a terminal device for short below: The terminal device may support a TDD technology. Further, the terminal device may support an NB-IoT technology, and the terminal device may be referred to as the TDD terminal device. The terminal device may be any communications device that needs to access a mobile communications system by using a network device. A type of the terminal device is not limited herein.

In this embodiment of this application, before sending the preamble, the terminal needs to determine a time-frequency resource for sending the preamble, and preamble format information of the preamble. Details are separately described below.

The terminal may obtain a random access configuration parameter from the network device, where the random access configuration parameter includes but is not limited to one or more of the following:

a reference signal received power (RSRP) threshold, where different RSRP thresholds correspond to different coverage levels;

a resource configuration parameter set; and the preamble format information.

The resource configuration parameter set may include one or more of the following parameters: a random access resource period; a frequency domain location of a start subcarrier; the number of subcarriers used for random access; the number of repetition times of random access: a random access start moment: a maximum quantity of times of random access preamble retransmission; and a configuration parameter of a common search space used for random access, including a start location of the common search space, the number of repetition times of the common search space, an offset of the common search space, and the like.

The preamble format information indicates at least one or more of the following:

the number of symbol groups included in the preamble:

the number of symbols included in each symbol group;

a time length of a cyclic prefix (CP) in each symbol group;

the number of consecutive subcarriers occupied by each symbol group; and a frequency hopping rule of the preamble.

A preamble format may be associated with the number of symbol groups included in a preamble, the number of symbols included in each symbol group, a time length of a cyclic prefix in each symbol group, the number of subcarriers occupied by each symbol group, a frequency hopping rule of the preamble, and the like. In this case, the preamble format information may be a preamble format index value. Each preamble format index value corresponds to the number of symbol groups included in a preamble, the number of symbols included in each symbol group, a time length of a cyclic prefix in each symbol group, the number of subcar- riers occupied by each symbol group, and a frequency hopping rule of the preamble.

It should be noted that in this embodiment of this application, in symbol groups included in one preamble, each symbol group includes a same quantity of symbols, each symbol group has a same time length of a cyclic prefix, and each symbol group occupies a same quantity of subcarriers.

When there are a plurality of possibilities of the quantity of consecutive subcarriers occupied by each symbol group, the preamble format information needs to indicate the information. When there is only one possibility of the quantity of consecutive subcarriers occupied by each symbol group, the preamble format information may not indicate the information. For example, when the preamble format information does not indicate the quantity of consecutive subcarriers occupied by each symbol group, each symbol group may occupy one subcarrier by default.

Figure 3:
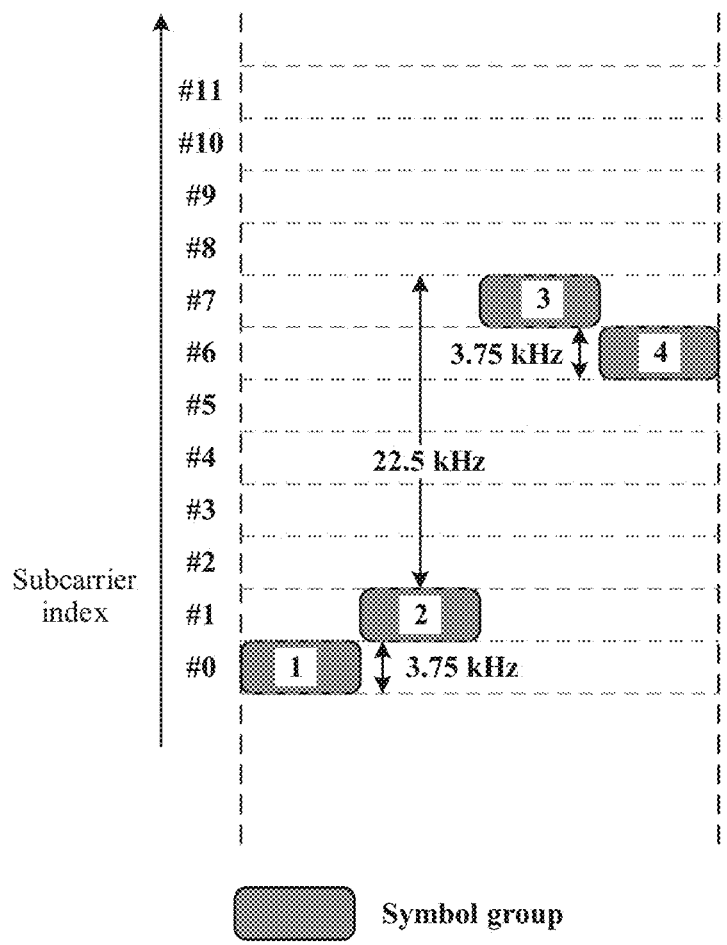
FIG. 3 is a schematic diagram of a frequency hopping rule according to an embodiment of this application.
Figure 4:
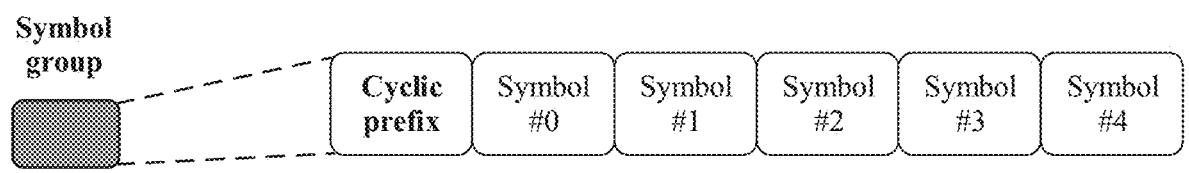
FIG. 4 is a schematic structural diagram of a symbol group according to an embodiment of this application.

In this embodiment of this application, the M symbol groups included in the preamble are transmitted on a PRACH through frequency hopping, and a frequency hop- ping rule of the preamble indicates how the M symbol groups are transmitted through frequency hopping. The frequency hopping rule of the preamble may be shown in FIG. 3. FIG. 3 is a schematic diagram of preamble frequency hopping according to an embodiment of this application. In FIG. 3, a preamble includes four groups of symbols, which are denoted as a first symbol group, a second symbol group, a third symbol group, and a fourth symbol group in a time sequence. The preamble has two frequency hopping inter- vals, which are respectively 3.75 kHz and 22.5 kHz, on a PRACH within one sending period. The frequency hopping interval is an integer multiple of a subcarrier bandwidth, and a minimum frequency hopping interval is the same as the subcarrier bandwidth. A frequency hopping interval between the first symbol group and the second symbol group is 3.75 kHz, and a frequency hopping interval between the third symbol group and the fourth symbol group is 3.75 kHz. A frequency hopping interval between the second group sym- bol group and the third symbol group is 22.5 kHz. Pseudo random frequency hopping is used between two adjacent sending periods, and a frequency hopping range is limited to 12 subcarriers. A specific structure of each symbol group may be shown in FIG. 4. In FIG. 4, one symbol group includes one cyclic prefix and five symbols, a subcarrier bandwidth is 3.75 kHz, a time length of the cyclic prefix may be 66.7 µs or 266.67 µs, the five symbols follow the cyclic prefix, and a time length of each symbol is 266.67 µs. All symbol groups in each preamble have a same structure. With reference to FIG. 4, information indicated by preamble format information may be as follows: the number of symbol groups included in a preamble is four, the number of symbols included in each symbol group is five, a length of a cyclic prefix in each symbol group is 66.7 µs, and each symbol group occupies one subcarrier. Certainly, the fore- going is merely an example. The information indicated by the preamble format information may alternatively be in another form, and details are not described herein.

It should be noted that a meaning of a symbol in the embodiments of this application includes but is not limited to an orthogonal frequency division multiplexing (OFDM) symbol, a filtered orthogonal frequency division multiplex- ing (F-OFDM) symbol, and the like, and may be specifically determined based on an actual situation. Details are not described herein.

In this embodiment of this application, there may be a correspondence between a resource configuration parameter set and a coverage level of a terminal, different coverage levels correspond to different resource configuration parameter sets, and a random access configuration parameter may include the resource configuration parameter sets corresponding to the different coverage levels. Certainly, the different coverage levels may correspond to a same resource configuration parameter set. In this case, the random access configuration parameter may include only one resource configuration parameter set.

A terminal device may measure an RSRP of a reference signal sent by a network device, and compare the RSRP obtained through measurement with an RSRP threshold in the random access configuration parameter, to determine a coverage level of the terminal device. For example, an RSRP threshold of 0 dB to 11 dB corresponds to a coverage level 1, an RSRP threshold of 12 dB to 23 dB corresponds to a coverage level 2, and an RSRP threshold of 24 dB to 35 dB corresponds to a coverage level 3. If the RSRP obtained by the terminal device through measurement is 13 dB, it may be determined that the terminal device corresponds to the coverage level 2. The reference signal may be a cell specific reference signal (CRS), a narrowband reference signal, or the like. This is not limited in this embodiment of this application.

With reference to the foregoing description, the terminal device may determine, based on the resource configuration parameter set in the random access configuration parameter, a time domain resource and a frequency domain resource of the preamble that needs to be sent. For example, there is a correspondence between the resource configuration parameter set and the coverage level of the terminal. The terminal device may determine the resource configuration parameter set based on the coverage level of the terminal device, and determine, based on the resource configuration parameter set, the time domain resource and the frequency domain resource for sending the preamble.

The determining, based on the resource configuration parameter set, the frequency domain resource for sending the preamble includes: determining, by the terminal device, a frequency domain resource set based on the resource configuration parameter set corresponding to the coverage level, and randomly selecting, by the terminal device from the frequency domain resource set, a frequency domain resource as the frequency domain resource of the preamble. The frequency domain resource may be one subcarrier or a plurality of subcarriers, and is related to a quantity of subcarriers occupied by each symbol group. If the number of consecutive subcarriers occupied by each symbol group is one, the frequency domain resource is one consecutive subcarrier, and if the number of consecutive subcarriers occupied by each symbol group is two, the frequency domain resource is two consecutive subcarriers. The determining, based on the resource configuration parameter set, the time domain resource for sending the preamble includes: determining, by the terminal device based on the resource configuration parameter set corresponding to the coverage level, a period and a start location that are for sending the preamble, and determining, by the terminal device, a valid period and start location as a time domain resource of the preamble. For example, a period and a start location that are closest to a moment at which random access is initiated may be selected.

In this embodiment of this application, when the random access configuration parameter includes the preamble format information, the terminal may directly determine the preamble format information of the preamble that needs to be sent, to determine information such as the number of symbol groups included in the preamble.

When the random access configuration parameter does not include the preamble format information, the terminal device may determine the preamble format information of the preamble based on the coverage level of the terminal device. Specifically, a correspondence between the preamble format information and the coverage level may be agreed on in advance in a protocol, and the terminal device determines, based on the correspondence, the preamble format information corresponding to the coverage level of the terminal device.

Step 202: The terminal device sends the M symbol groups in K uplink subframe sets.

Any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M. N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Frequency hopping may mean that adjacent symbol groups occupy different subcarrier frequencies during transmission, and frequency hopping occurs on a symbol group that is transmitted later in time relative to a symbol group that is transmitted earlier in time. The N times of frequency hopping exist in the M symbol groups, and each time of frequency hopping is frequency hopping between adjacent symbol groups in the M symbol groups.

There may be two frequency hopping directions: from a high frequency to a low frequency and from a low frequency to a high frequency.

The K uplink subframe sets may be located in one radio frame. Certainly, the K uplink subframe sets may alternatively be distributed in a plurality of consecutive radio frames.

It should be noted that a time domain length of each uplink subframe set is greater than or equal to a time domain length of a symbol group sent in the uplink subframe set. Each uplink subframe set may include a guard time (GT), used to avoid interference of the preamble to a subsequent downlink subframe. In this case, a time domain length of each uplink subframe set is greater than a time domain length of a symbol group sent in the uplink subframe set.

In step 202, the M symbol groups in the preamble are transmitted through frequency hopping, the N times of frequency hopping exist between adjacent symbol groups in the M symbol groups, and the directions of at least two of the N times of frequency hopping are opposite, where N is less than M. Correspondingly, values of M and K may have a plurality of cases, and the number of consecutive subframes included in each uplink subframe set may also have a plurality of cases. The following separately provides descriptions with reference to different cases.

Case 1:

When one symbol group occupies one subcarrier, M may be equal to 6, and each symbol group includes a maximum of three symbols and one cyclic prefix. The terminal device may send three symbol groups in each of the K uplink subframe sets. In this case, K is equal to 2. The K uplink subframe sets include a first uplink subframe set and a second uplink subframe set.

In this case, the number of symbols included in each of the M symbol groups and the number of consecutive subframes included in the uplink subframe set may have the following correspondence:

Based on an uplink-downlink configuration relationship in an uplink-downlink subframe configuration ratio in an existing radio frame, a maximum of three uplink subframes in one radio frame are consecutive in time. Therefore, one uplink subframe set includes a maximum of three consecutive subframes. The number of consecutive uplink subframes included in each uplink subframe set is one, two, or three. A time length of one uplink subframe is 1 ms. A symbol length of each symbol group of the preamble is inversely proportional to a subcarrier bandwidth of the preamble. For example, if the subcarrier bandwidth of the preamble is 3.75 kHz, a symbol length of each symbol group of the preamble is 1/3.75 kHz≈266.67 μs. When the quantity of consecutive uplink subframes included in each uplink subframe set is three, each symbol group of the preamble may include three, two, or one symbol. When the quantity of consecutive uplink subframes included in each uplink subframe set is two, each symbol group of the preamble may include two or one symbol. When the quantity of consecutive uplink subframes included in each uplink subframe set is two, each symbol group of the preamble may include one symbol. A time length of the cyclic prefix is obtained as follows: A total time length of all symbols in each uplink subframe set is subtracted from a time length of each uplink subframe set, to obtain a time length, and then the obtained time length is divided by the number of symbol groups in each uplink subframe set (where there is no GT in each uplink subframe set), or by the number of symbol groups in each uplink subframe set plus 1 (where there is a GT in each uplink subframe set, and a time length of the GT is equal to the time length of the CP), to obtain the time length of the cyclic prefix.

In this case, the terminal device may send a first symbol group, a second symbol group, and a third symbol group in the M symbol groups in the first uplink subframe set, and may send a fourth symbol group, a fifth symbol group, and a sixth symbol group in the M symbol groups in the second uplink subframe set.

The first symbol group to the sixth symbol group are marked in a time sequence by the M symbol groups. For details, refer to an example in an accompanying drawing such as FIG. 5.

In a first scenario of the case 1, a frequency hopping interval between the first symbol group and the second symbol group is the same as a frequency hopping interval between the second symbol group and the third symbol group, and is $\Delta f_1$; and a frequency hopping direction between the first symbol group and the second symbol group is opposite to a frequency hopping direction between the second symbol group and the third symbol group.

Further, a frequency hopping interval between the fourth symbol group and the fifth symbol group is the same as a frequency hopping interval between the fifth symbol group and the sixth symbol group, and is $\Delta f_2$; and a frequency hopping direction between the fourth symbol group and the fifth symbol group is opposite to a frequency hopping direction between the fifth symbol group and the sixth symbol group.

Figure 5:
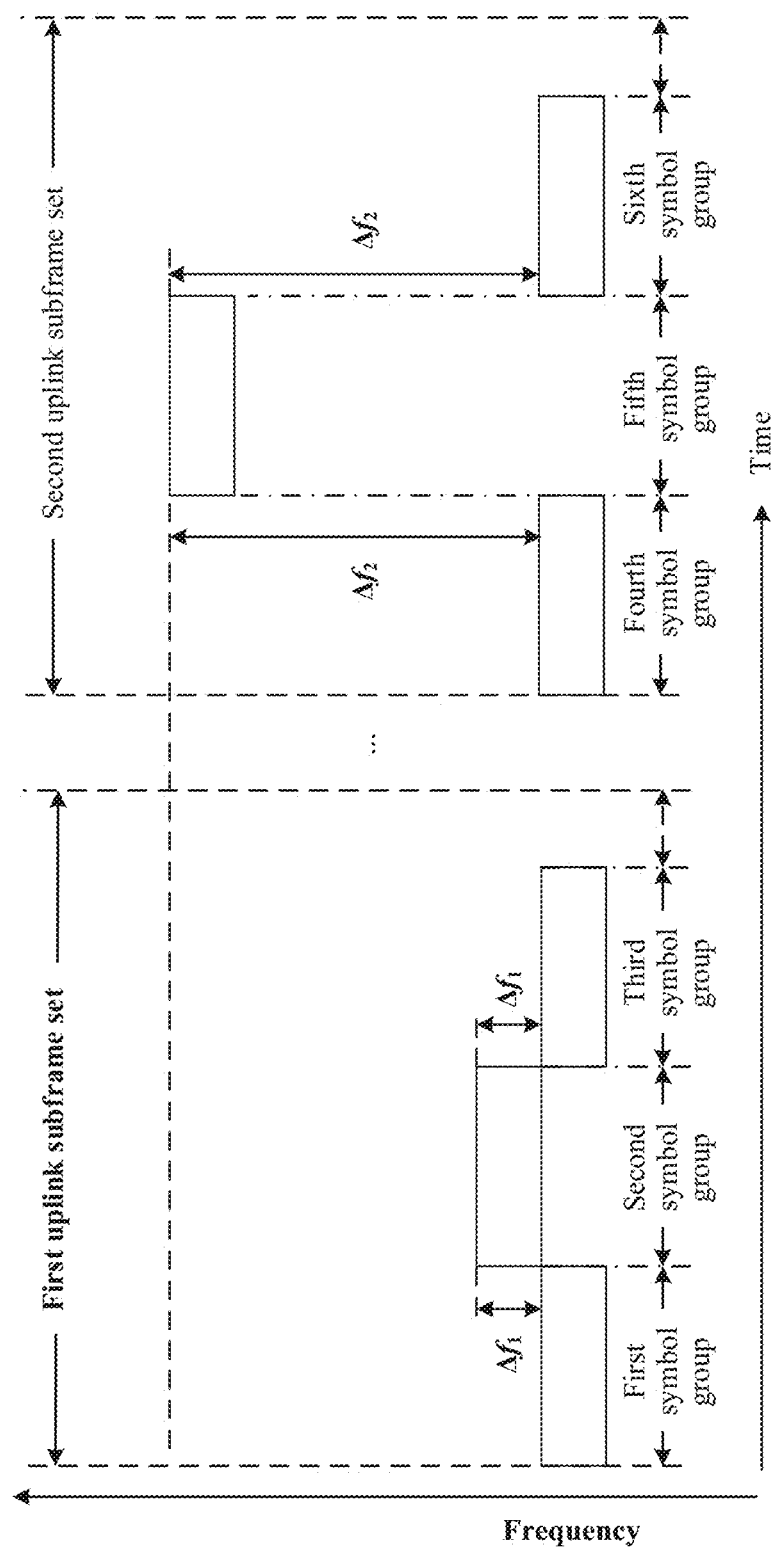
FIG. 5 is a schematic diagram of transmitting a preamble according to an embodiment of this application.

Further, the frequency hopping interval between the first symbol group and the second symbol group is less than the frequency hopping interval between the fourth symbol group and the fifth symbol group, that is, $\Delta f_1$ is less than $\Delta f_1$. For example, $\Delta f_1$ is equal to a frequency band width of one subcarrier, and $\Delta f_2$ is equal to a width of E/2 subcarrier spacings, where E is the number of subcarriers included in a frequency hopping range of a symbol group in the preamble, and E may be agreed on in a protocol. For example, FIG. 5 is a schematic diagram of transmitting a preamble according to an embodiment of this application. In FIG. 5, in symbol groups sent in a first uplink subframe set, a frequency hopping interval between a first symbol group and a second symbol group is the same as a frequency hopping interval between the second symbol group and a third symbol group, and both are $\Delta f_1$; and a frequency hopping direction between the first symbol group and the second symbol group is opposite to a frequency hopping direction between the second symbol group and the third symbol group. In symbol groups sent in a second uplink subframe set, a frequency hopping interval between a fourth symbol group and a fifth symbol group is the same as a frequency hopping interval between a fifth symbol group and a sixth symbol group, and both are $\Delta f_2$, where $\Delta f_2$ may be equal to $6\Delta f_1$. A frequency hopping direction between the fourth symbol group and the fifth symbol group is opposite to a frequency hopping direction between the fifth symbol group and the sixth symbol group.

Certainly, the frequency hopping interval between the first symbol group and the second symbol group may alternatively be greater than the frequency hopping interval between the fourth symbol group and the fifth symbol group, that is, $\Delta f_1$ is greater than $\Delta f_2$. Details are not described herein.

In a second scenario of the case 1, the frequency hopping interval between the first symbol group and the second symbol group is different from the frequency hopping interval between the second symbol group and the third symbol group; and the frequency hopping direction between the first symbol group and the second symbol group may be the same as or opposite to the frequency hopping direction between the second symbol group and the third symbol group.

Further, the frequency hopping interval between the fourth symbol group and the fifth symbol group is different from the frequency hopping interval between the fifth symbol group and the sixth symbol group; and the frequency hopping direction between the fourth symbol group and the fifth symbol group may be the same as or opposite to the frequency hopping direction between the fifth symbol group and the sixth symbol group.

Further, the frequency hopping direction between the second symbol group and the third symbol group is opposite to the frequency hopping direction between the fifth symbol group and the sixth symbol group. The frequency hopping direction between the first symbol group and the second symbol group may be the same as or opposite to the frequency hopping direction between the fourth symbol group and the fifth symbol group.

Further, the frequency hopping interval between the first symbol group and the second symbol group is less than the frequency hopping interval between the second symbol group and the third symbol group, and the frequency hopping interval between the fourth symbol group and the fifth symbol group is less than the frequency hopping interval between the fifth symbol group and the sixth symbol group.

Figure 6:
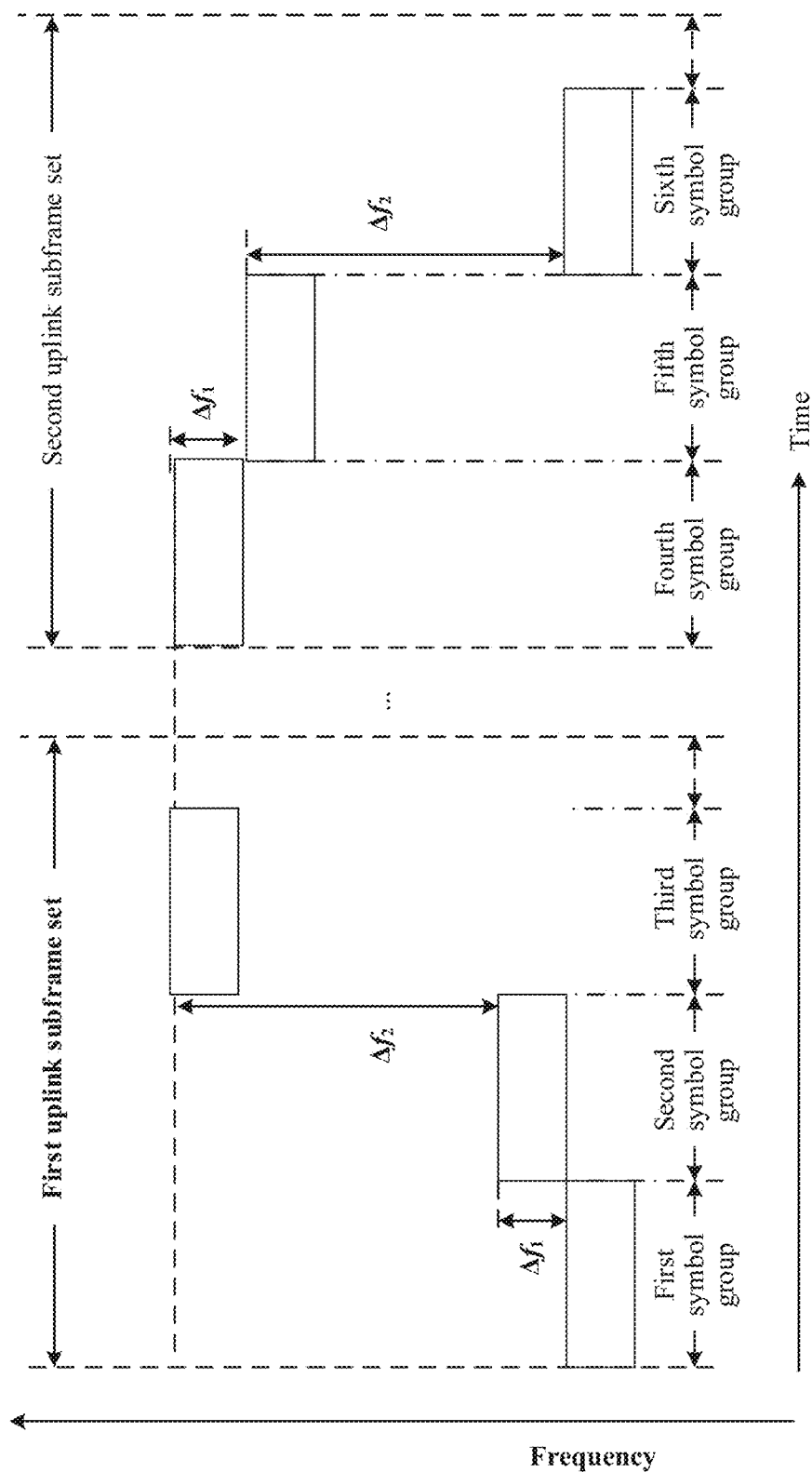
FIG. 6 is a schematic diagram of transmitting a preamble according to an embodiment of this application.

For example, FIG. 6 is a schematic diagram of transmitting a preamble according to an embodiment of this application. In FIG. 6, in symbol groups sent in a first uplink subframe set, a frequency hopping interval between a first symbol group and a second symbol group is $\Delta f_1$, and a frequency hopping interval between the second symbol group and a third symbol group is $\Delta f_2$. A frequency hopping direction between the first symbol group and the second symbol group is the same as a frequency hopping direction between the second symbol group and the third symbol group. In symbol groups sent in a second uplink subframe set, a frequency hopping interval between a fourth symbol group and a fifth symbol group is $\Delta f_1$, and a frequency hopping interval between the fifth symbol group and a sixth symbol group is $\Delta f_1$, where $\Delta f_1$ may be equal to $6\Delta f_1$. A frequency hopping direction between the fourth symbol group and the fifth symbol group is the same as a frequency hopping direction between the fifth symbol group and the sixth symbol group. The frequency hopping direction between the first symbol group and the second symbol group is opposite to the frequency hopping direction between the fourth symbol group and the fifth symbol group, and the frequency hopping direction between the second symbol group and the third symbol group is opposite to the frequency hopping direction between the fifth symbol group and the sixth symbol group.

Certainly, when M is equal to 6 and K is equal to 2, the M symbol groups may alternatively have another frequency hopping rule. Examples are not described one by one herein.

Case 2:

When one symbol group occupies one subcarrier, M may be equal to 4. The terminal device may send two symbol groups in each of the K uplink subframe sets. In this case, K is equal to 2. The K uplink subframe sets include a first uplink subframe set and a second uplink subframe set.

In this case, the number of symbols included in each of the M symbol groups and the number of consecutive subframes included in the uplink subframe set may have the following correspondence:

Based on an uplink-downlink configuration relationship in an uplink-downlink subframe configuration ratio in an existing radio frame, a maximum of three uplink subframes in one radio frame are consecutive in time. Therefore, one uplink subframe set includes a maximum of three consecutive subframes. The number of consecutive uplink subframes included in each uplink subframe set is one, two, or three. A time length of one uplink subframe is 1 ms. A symbol length of each symbol group of the preamble is inversely proportional to a subcarrier bandwidth of the preamble. For example, if the subcarrier bandwidth of the preamble is 3.75 kHz, a symbol length of each symbol group of the preamble is 1/3.75 kHz≈266.67 μs. When the quantity of consecutive uplink subframes included in each uplink subframe set is three, each symbol group of the preamble may include five, four, three, two, or one symbol. When the quantity of consecutive uplink subframes included in each uplink subframe set is two, each symbol group of the preamble may include three, two, or one symbol. When the quantity of consecutive uplink subframes included in each uplink subframe set is two, each symbol group of the preamble may include one symbol. A time length of the cyclic prefix is obtained as follows: A total time length of all symbols in each uplink subframe set is subtracted from a time length of each uplink subframe set, to obtain a time length, and then the obtained time length is divided by the number of symbol groups in each uplink subframe set (where there is no GT in each uplink subframe set), or by the number of symbol groups in each uplink subframe set plus 1 (where there is a GT in each uplink subframe set, and a time length of the GT is equal to the time length of the CP), to obtain the time length of the cyclic prefix.

In this case, the terminal device may send a first symbol group and a second symbol group in the M symbol groups in the first uplink subframe set, and may send a third symbol group and a fourth symbol group in the M symbol groups in the second uplink subframe set.

In the case 2, the frequency hopping direction between the first symbol group and the second symbol group may be opposite to the frequency hopping direction between the third symbol group and the fourth symbol group.

Further, the frequency hopping interval between the first symbol group and the second symbol group is different from the frequency hopping interval between the third symbol group and the fourth symbol group.

Further, the frequency hopping interval between the first symbol group and the second symbol group is less than the frequency hopping interval between the third symbol group and the fourth symbol group. For example, the frequency hopping interval between the first symbol group and the second symbol group is equal to a frequency band width of one subcarrier, and the frequency hopping interval between the third symbol group and the fourth symbol group is equal to a width of E/2 subcarrier spacings, where E is the number of subcarriers included in a frequency hopping range of a symbol group in the preamble, and E may be agreed on in a protocol.

Figure 7:
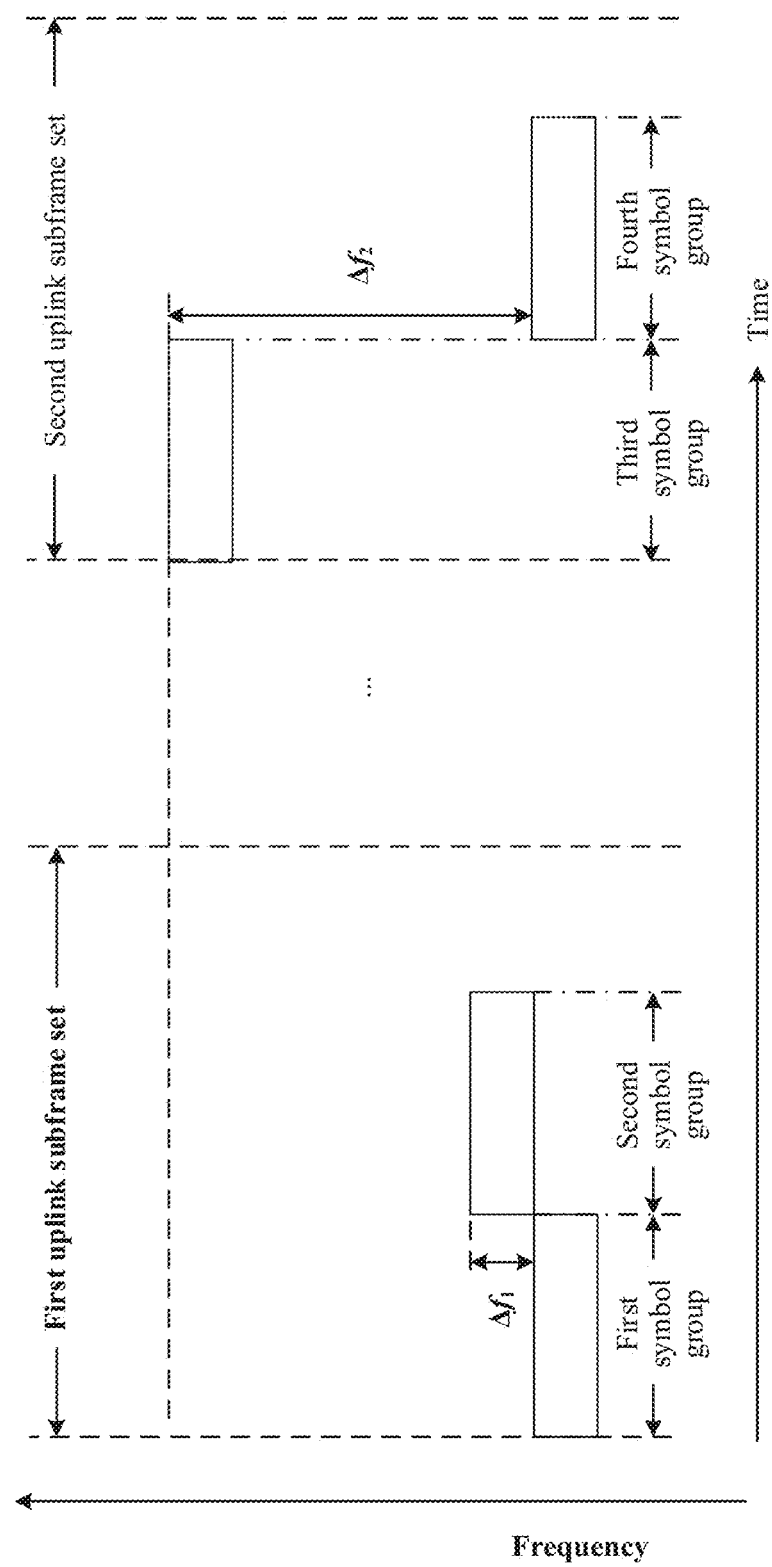
FIG. 7 is a schematic diagram of transmitting a preamble according to an embodiment of this application.

For example, FIG. 7 is a schematic diagram of transmitting a preamble according to an embodiment of this application. In FIG. 7, in symbol groups sent in a first uplink subframe set, a frequency hopping interval between a first symbol group and a second symbol group is $\Delta f_1$. In symbol groups sent in a second uplink subframe set, a frequency hopping interval between a third symbol group and a fourth symbol group is $\Delta f_1$, where $\Delta f_2$ may be equal to $6\Delta f_1$. A frequency hopping direction between the first symbol group and the second symbol group is opposite to a frequency hopping direction between the third symbol group and the fourth symbol group.

Figure 8:
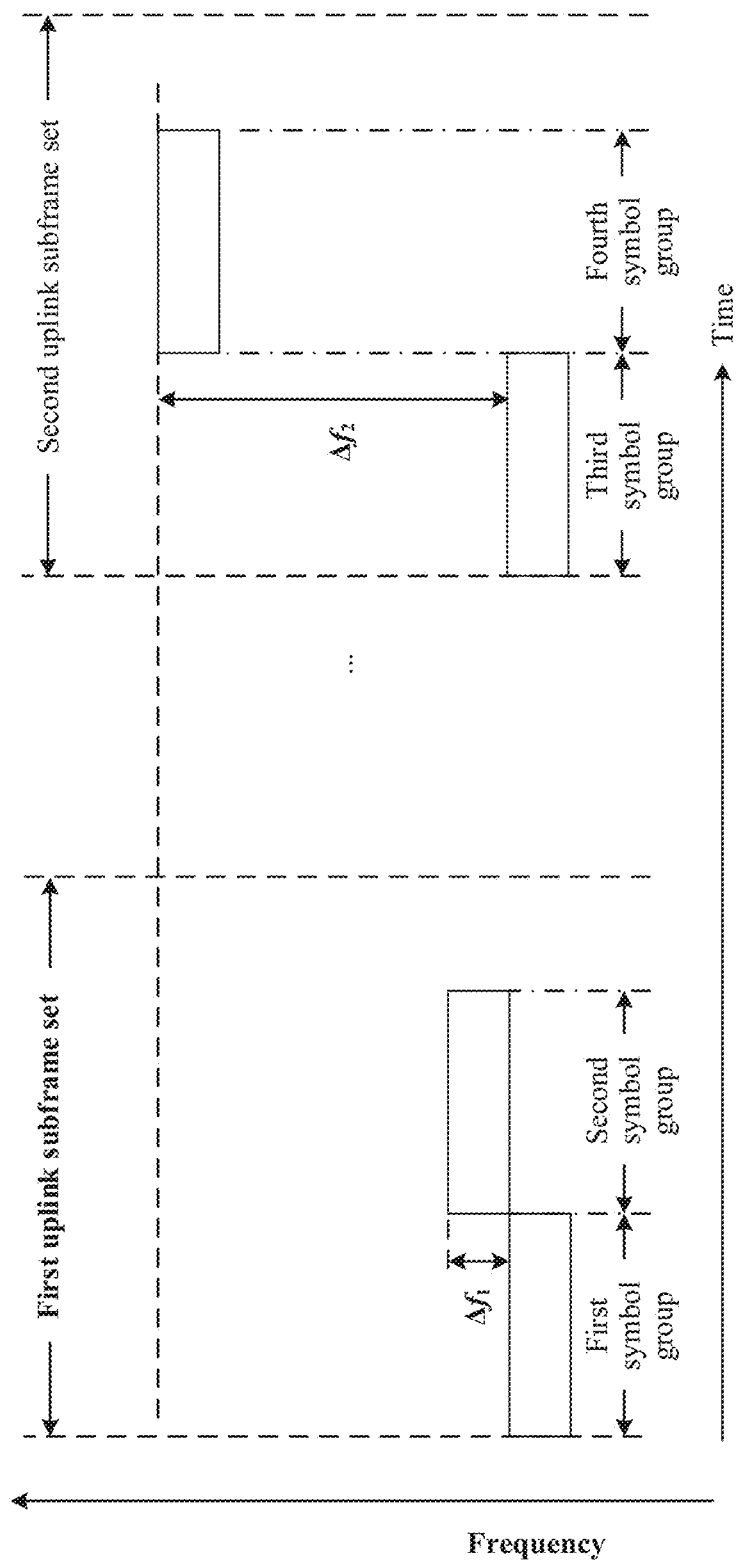
FIG. 8 is a schematic diagram of transmitting a preamble according to an embodiment of this application.

Certainly, the frequency hopping direction between the first symbol group and the second symbol group may alternatively be the same as the frequency hopping direction between the third symbol group and the fourth symbol group. This is specifically shown in FIG. 8.

Certainly, when M is equal to 4 and K is equal to 2, the M symbol groups may alternatively have another frequency hopping rule. Examples are not described one by one herein.

Case 3:

In this embodiment of this application, when one symbol group occupies one subcarrier. M may be equal to 4, and K is equal to 1. The terminal device may send four symbol groups in one uplink subframe set. The number of uplink subframes included in the uplink subframe set may be two or three.

In this case, the terminal device may send the first symbol group, the second symbol group, the third symbol group, and the fourth symbol group in the M symbol groups in the K uplink subframe sets.

There may be two frequency hopping intervals between the first symbol group and the fourth symbol group: $\Delta f$ and $\Delta f \times E/2$, where $\Delta f$ is a subcarrier width, and E is the number of subcarriers included in a frequency hopping range of a symbol group in the preamble.

In this case, the frequency hopping direction between the first symbol group and the second symbol group is opposite to the frequency hopping direction between the third symbol group and the fourth symbol group.

Further, the frequency hopping interval between the first symbol group and the second symbol group is $\Delta f$, the frequency hopping interval between the second symbol group and the third symbol group is $\Delta f \times E/2$, and the frequency hopping interval between the third symbol group and the fourth symbol group is Δf. E may be agreed on in a protocol. For details, refer to FIG. 9.

Figure 9:
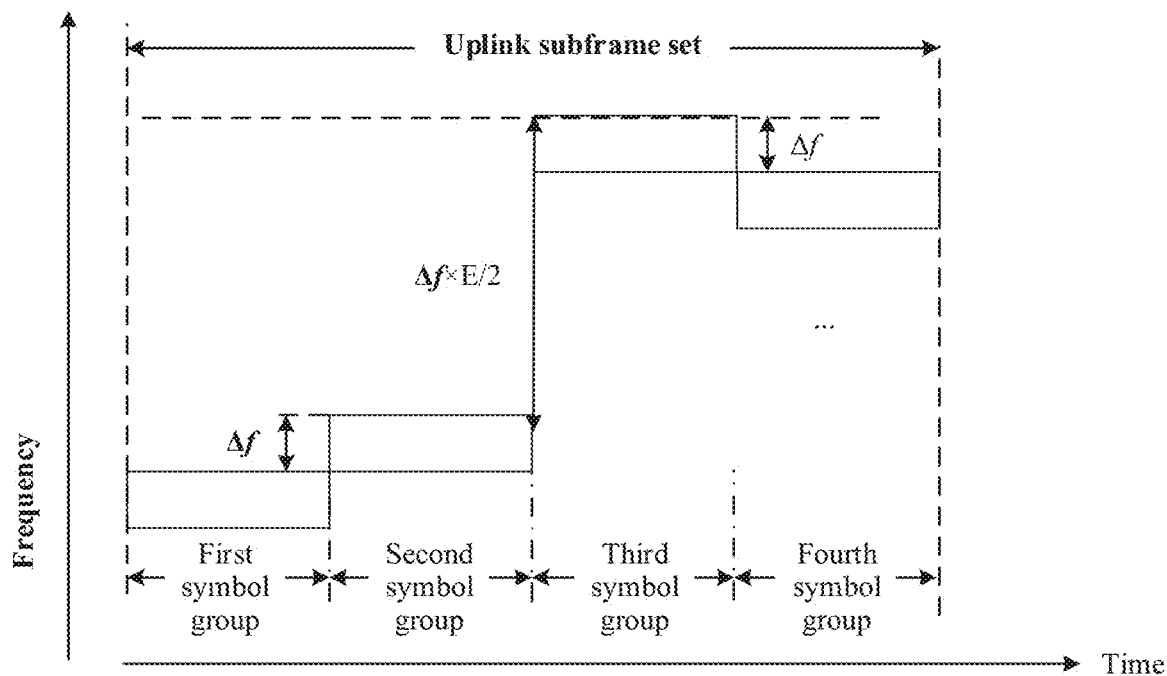
FIG. 9 is a schematic diagram of transmitting a preamble according to an embodiment of this application.

A frequency hopping rule of a symbol group in a preamble shown in FIG. 9 is the same as a frequency hopping rule of a symbol group in a preamble in FDD NB-IoT. Therefore, time of arrival (ToA) estimation precision that is the same as that of the preamble in FDD NB-IoT can be achieved.

Certainly, when M is equal to 4 and K is equal to 1, the M symbol groups may alternatively have another frequency hopping rule. Examples are not described one by one herein.

It should be noted that FIG. 5 to FIG. 9 are merely examples, and the M symbol groups in the preamble may alternatively be transmitted according to another frequency hopping rule. Examples are not described one by one herein.

It should be noted that in any one of the foregoing cases, a frequency hopping interval between two symbol groups that are closest in time domain in adjacent uplink subframe sets may be a fixed interval, or the frequency hopping interval may be determined in a pseudo random frequency hopping manner.

Step 203: The network device receives the preamble sent by the terminal device in the K uplink subframe sets, where the preamble includes the M symbol groups.

For specific content of step 203, refer to descriptions in step 201 and step 202. Details are not described herein again.

Step 204: The network device performs uplink synchronization measurement based on the preamble.

Specifically, the network device may measure a difference between an actual time at which the preamble sent by the terminal device arrives at the network device and a time predicted by the network device, so that the network device can perform uplink synchronization on the terminal device based on the difference.

The foregoing described cases are described by using an example in which one symbol group occupies one subcarrier. In this embodiment of this application, one symbol group may alternatively occupy two or more consecutive subcarriers. The following uses an example in which one symbol group occupies two consecutive subcarriers for description. For another case, refer to the description herein. Details are not described herein again.

When one symbol group occupies two consecutive subcarriers, the terminal device may send the M symbol groups in the preamble in the K uplink subframe sets.

Corresponding to the procedure in FIG. 2, any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 0, and K is less than or equal to M. Each of the M symbol groups occupies two consecutive subcarriers. N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Correspondingly, values of M and K may have a plurality of cases, and the number of consecutive subframes included in each uplink subframe set may also have a plurality of cases. The following separately provides descriptions with reference to different cases.

Case 4:

When one symbol group occupies two consecutive subcarriers, M may be equal to 3, and K is equal to 1. The terminal device may send three symbol groups in one uplink subframe set. The number of uplink subframes included in the uplink subframe set may be two or three.

The number of uplink subframes included in each uplink subframe set is one, two, or three. A time length of one uplink subframe is 1 ms. A symbol length of each symbol group of the preamble is inversely proportional to a subcarrier bandwidth of the preamble. For example, if the subcarrier bandwidth of the preamble is 3.75 kHz, a symbol length of each symbol group of the preamble is 1/3.75 kHz≈266.67 μs. When the quantity of consecutive uplink subframes included in each uplink subframe set is three, each symbol group of the preamble may include three, two, or one symbol. When the quantity of consecutive uplink subframes included in each uplink subframe set is two, each symbol group of the preamble may include two or one symbol. When the quantity of consecutive uplink subframes included in each uplink subframe set is two, each symbol group of the preamble may include one symbol. A time length of the cyclic prefix is obtained as follows: A total time length of all symbols in each uplink subframe set is subtracted from a time length of each uplink subframe set, to obtain a time length, and then the obtained time length is divided by the number of symbol groups in each uplink subframe set (where there is no GT in each uplink subframe set), or by the number of symbol groups in each uplink subframe set plus 1 (where there is a GT in each uplink subframe set, and a time length of the GT is equal to the time length of the CP), to obtain the time length of the cyclic prefix.

In this case, the terminal device sends the first symbol group, the second symbol group, and the third symbol group in the M symbol groups in the one uplink subframe set.

The frequency hopping direction between the first symbol group and the second symbol group is opposite to the frequency hopping direction between the second symbol group and the third symbol group; and the frequency hopping interval between the first symbol group and the second symbol group is the same as the frequency hopping interval between the second symbol group and the third symbol group.

Figure 10:
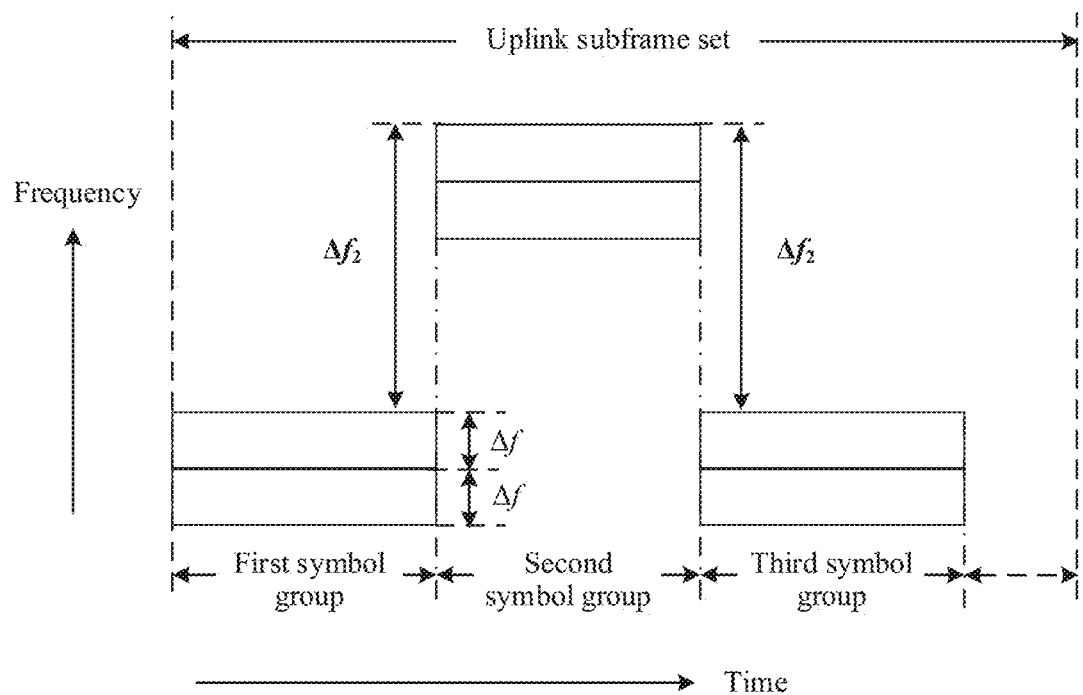
FIG. 10 is a schematic diagram of transmitting a preamble according to an embodiment of this application.

For example, FIG. 10 is a schematic diagram of transmitting a preamble according to an embodiment of this application. In FIG. 10, each symbol group in a preamble occupies two consecutive subcarriers. A frequency hopping interval between a first symbol group and a second symbol group is $\Delta f_2$, and a frequency hopping interval between the second symbol group and a third symbol group is $\Delta f_2$, where $\Delta f_2$ may be equal to $6\Delta f$, and $\Delta f$ is a subcarrier width. A frequency hopping direction between the first symbol group and the second symbol group is opposite to a frequency hopping direction between the second symbol group and the third symbol group.

It should be noted that, in this embodiment of this application, a meaning of the frequency hopping interval between two symbol groups is an interval between subcarriers respectively occupied by the two symbol groups. For example, the first symbol group occupies subcarriers $f_1$ and $f_2$, where $f_1$ is located at a low frequency location relative to $f_2$, that is, $f_1 < f_1$; and the second symbol group occupies subcarriers $f_3$ and $f_1$, where $f_2$ is located at a low frequency location relative to $f_3$, and $f_3$ is located at a low frequency location relative to $f_4$, that is, $f_2 < f_3 < f_4$. The frequency hopping interval between the first symbol group and the second symbol group represents an interval from $f_1$ to $f_3$ or an interval from $f_2$ to $f_4$. For a meaning of the frequency hopping interval between two symbol groups described in any one of the following cases, refer to the definition herein.

Certainly, when M is equal to 3 and K is equal to 1, the M symbol groups may alternatively have another frequency hopping rule. Examples are not described one by one herein.

Case 5: One symbol group occupies two consecutive subcarriers, K is equal to 2, and M is equal to 2.

The terminal device may send the first symbol group in the M symbol groups in the first uplink subframe set in the two uplink subframe sets, and may send the second symbol group in the M symbol groups in the second uplink subframe set in the two uplink subframe sets.

The number of uplink subframes included in each uplink subframe set may be one, two, or three.

Based on an uplink-downlink configuration relationship in an uplink-downlink subframe configuration ratio in an existing radio frame, a maximum of three uplink subframes in one radio frame are consecutive in time. Therefore, one uplink subframe set includes a maximum of three consecutive subframes. The number of consecutive uplink subframes included in each uplink subframe set is one, two, or three. A time length of one uplink subframe is 1 ms. A symbol length of each symbol group of the preamble is inversely proportional to a subcarrier bandwidth of the preamble. For example, if the subcarrier bandwidth of the preamble is 3.75 kHz, a symbol length of each symbol group of the preamble is 1/3.75 kHz≈266.67 µs. When the quantity of consecutive uplink subframes included in each uplink subframe set is three, each symbol group of the preamble may include five, four, three, two, or one symbol. When the quantity of consecutive uplink subframes included in each uplink subframe set is two, each symbol group of the preamble may include three, two, or one symbol. When the quantity of consecutive uplink subframes included in each uplink subframe set is two, each symbol group of the preamble may include one symbol. A time length of the cyclic prefix is obtained as follows: A total time length of all symbols in each uplink subframe set is subtracted from a time length of each uplink subframe set, to obtain a time length, and then the obtained time length is divided by the number of symbol groups in each uplink subframe set (where there is no GT in each uplink subframe set), or by the number of symbol groups in each uplink subframe set plus 1 (where there is a GT in each uplink subframe set, and a time length of the GT is equal to the time length of the CP), to obtain the time length of the cyclic prefix.

A frequency hopping interval between the first symbol group and the second symbol group is a width of E/2 subcarrier spacings, where E is the number of subcarriers included in a frequency hopping range. E may be agreed on in a protocol. Certainly, the frequency hopping interval between the first symbol group and the second symbol group may alternatively be another width. Examples are not described one by one herein.

Figure 11:
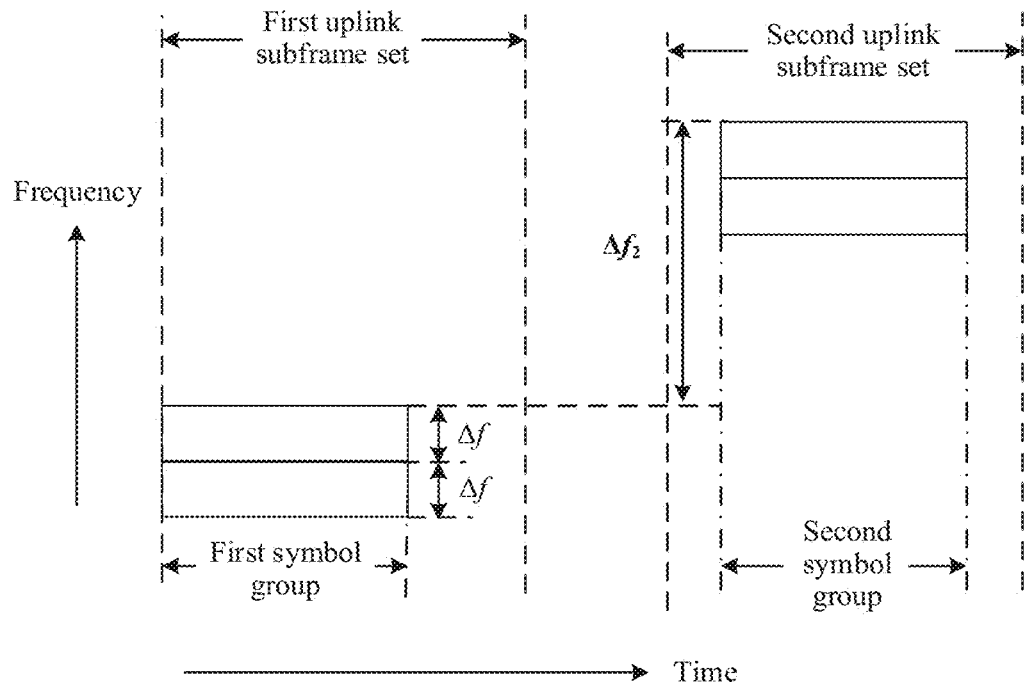
FIG. 11 is a schematic diagram of transmitting a preamble according to an embodiment of this application.

For example, FIG. 11 is a schematic diagram of transmitting a preamble according to an embodiment of this application. In FIG. 11, each symbol group in a preamble occupies two consecutive subcarriers. A terminal device sends a first symbol group in a first uplink subframe set, and sends a second symbol group in a second uplink subframe set, where a frequency hopping interval between the first symbol group and the second symbol group is $\Delta f_1$; and a frequency hopping interval between the second symbol group and a third symbol group is $\Delta f_2$, where $\Delta f_2$ may be equal to $6\Delta f$, and $\Delta f$ is a subcarrier width.

Certainly, when M is equal to 2 and K is equal to 2, the M symbol groups may alternatively have another frequency hopping rule. Examples are not described one by one herein.

Case 6: One symbol group occupies two consecutive subcarriers, K is equal to 1, and M is equal to 2.

The terminal device may send the first symbol group and the second symbol group in the M symbol groups in the one uplink subframe set.

A frequency hopping interval between the first symbol group and the second symbol group is a width of E/2 subcarrier spacings, where E is the number of subcarriers included in a frequency hopping range of the first symbol group and the second symbol group. Certainly, the frequency hopping interval between the first symbol group and the second symbol group may alternatively be another width. Examples are not described one by one herein.

Figure 12:
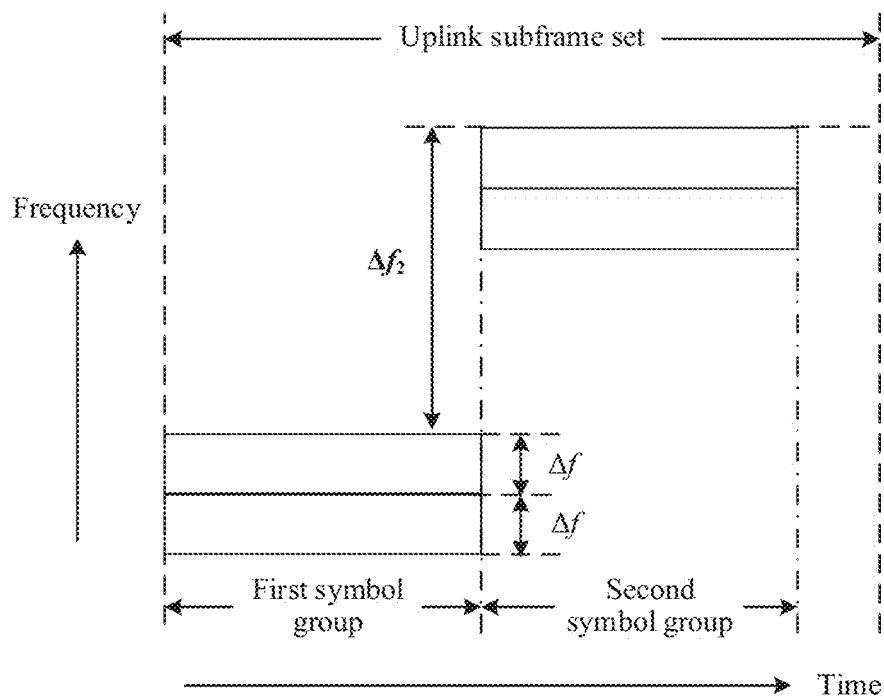
FIG. 12 is a schematic diagram of transmitting a preamble according to an embodiment of this application.

For example, FIG. 12 is a schematic diagram of transmitting a preamble according to an embodiment of this application. In FIG. 12, each symbol group in a preamble occupies two consecutive subcarriers. A terminal device sends a first symbol group and a second symbol group in one uplink subframe set, where a frequency hopping interval between the first symbol group and the second symbol group is $\Delta f_1$ and a frequency hopping interval between the second symbol group and a third symbol group is $\Delta f_4$, where $\Delta f_1$ may be equal to $6\Delta f$, and $\Delta f$ is a subcarrier width.

Certainly, when M is equal to 2 and K is equal to 1, the M symbol groups may alternatively have another frequency hopping rule. Examples are not described one by one herein.

Based on an uplink-downlink configuration relationship in an uplink-downlink subframe configuration ratio in an existing radio frame, a maximum of three uplink subframes in one radio frame are consecutive in time. Therefore, one uplink subframe set includes a maximum of three consecutive subframes. The number of consecutive uplink subframes included in each uplink subframe set is one, two, or three. A time length of one uplink subframe is 1 ms. A symbol length of each symbol group of the preamble is inversely proportional to a subcarrier bandwidth of the preamble. For example, if the subcarrier bandwidth of the preamble is 3.75 kHz, a symbol length of each symbol group of the preamble is 1/3.75 kHz≈266.67 µs. When the quantity of consecutive uplink subframes included in each uplink subframe set is three, each symbol group of the preamble may include eleven, ten, nine, eight, seven, six, five, four, three, two, or one symbol. When the quantity of consecutive uplink subframes included in each uplink subframe set is two, each symbol group of the preamble may include seven, six, five, four, three, two, or one symbol. When the quantity of consecutive uplink subframes included in each uplink subframe set is two, each symbol group of the preamble may include three, two, or one symbol. A time length of the cyclic prefix is obtained as follows: A total time length of all symbols in each uplink subframe set is subtracted from a time length of each uplink subframe set, to obtain a time length, and then the obtained time length is divided by the number of symbol groups in each uplink subframe set (where there is no GT in each uplink subframe set), or by the number of symbol groups in each uplink subframe set plus 1 (where there is a GT in each uplink subframe set, and a time length of the GT is equal to the time length of the CP), to obtain the time length of the cyclic prefix.

It should be noted that in any one of the foregoing cases, a frequency hopping interval between two symbol groups that are closest in time domain in adjacent uplink subframe sets may be a fixed interval, or the frequency hopping interval may be determined in a pseudo random frequency hopping manner.

Based on a same technical concept, the embodiments of this application further provide a communications device.

The communications device may perform step 201 and step 202 in the procedure shown in FIG. 2, and content related to step 201 and step 202.

Figure 13:
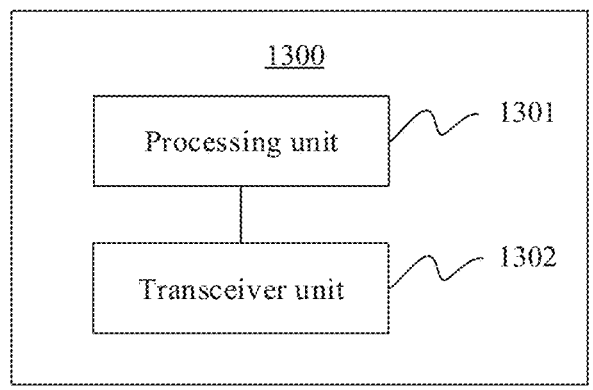
FIG. 13 is a schematic structural diagram of a communications device according to an embodiment of this application.

FIG. 13 is a schematic structural diagram of a communications device according to an embodiment of this application.

Referring to FIG. 13, the communications device 1300 includes a processing unit 1301 and a transceiver unit 1302.

The processing unit 1301 is configured to determine a preamble, where the preamble includes M symbol groups, where M is a positive integer greater than 1.

The transceiver unit 1302 is configured to send the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M. and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

Optionally, M is equal to 6.

K is equal to 2, and each of the two uplink subframe sets is used to send three symbol groups.

Optionally, the K uplink subframe sets include a first uplink subframe set and a second uplink subframe set.

The transceiver unit 1302 is specifically configured to:

send a first symbol group, a second symbol group, and a third symbol group in the M symbol groups in the first uplink subframe set; and send a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver unit 1302 is specifically configured to:

send a first symbol group and a second symbol group in the M symbol groups in the first uplink subframe set; and send a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

It should be understood that division of all the units is merely logical function division. During actual implementation, all or some of the units may be integrated into one physical entity, or may be physically separate.

Based on a same technical concept, the embodiments of this application further provide a communications device. The communications device may perform step 203 and step 204 in the procedure shown in FIG. 2, and content related to step 203 and step 204.

Figure 14:
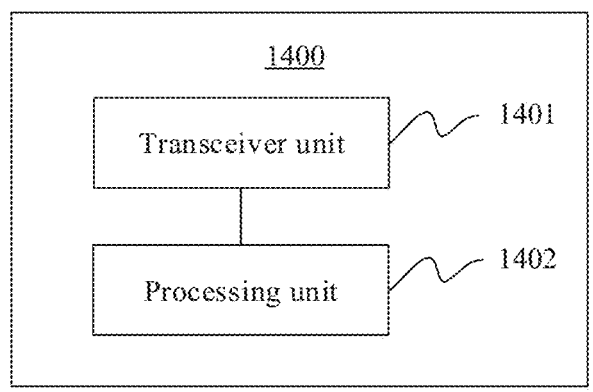
FIG. 14 is a schematic structural diagram of a communications device according to an embodiment of this application.

FIG. 14 is a schematic structural diagram of a communications device according to an embodiment of this application.

Referring to FIG. 14, the communications device 1400 includes a transceiver unit 1401 and a processing unit 1402.

The transceiver unit 1401 is configured to receive a preamble sent by a terminal device in K uplink subframe sets, where the preamble includes M symbol groups: any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, M is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

The processing unit 1402 is configured to perform uplink synchronization measurement based on the preamble.

Optionally, M is equal to 6.

K is equal to 2, and each of the two uplink subframe sets is used to send three symbol groups.

Optionally, the K uplink subframe sets include a first uplink subframe set and a second uplink subframe set.

The transceiver unit is specifically configured to:

receive a first symbol group, a second symbol group, and a third symbol group in the M symbol groups in the first uplink subframe set; and receive a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver unit is specifically configured to:

receive a first symbol group and a second symbol group in the M symbol groups in the first uplink subframe set; and receive a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

It should be understood that division of all the units is merely logical function division. During actual implementation, all or some of the units may be integrated into one physical entity, or may be physically separate.

Based on a same technical concept, the embodiments of this application further provide a communications device. The communications device may perform step 201 and step 202 in the procedure shown in FIG. 2, and content related to step 201 and step 202.

Figure 15:
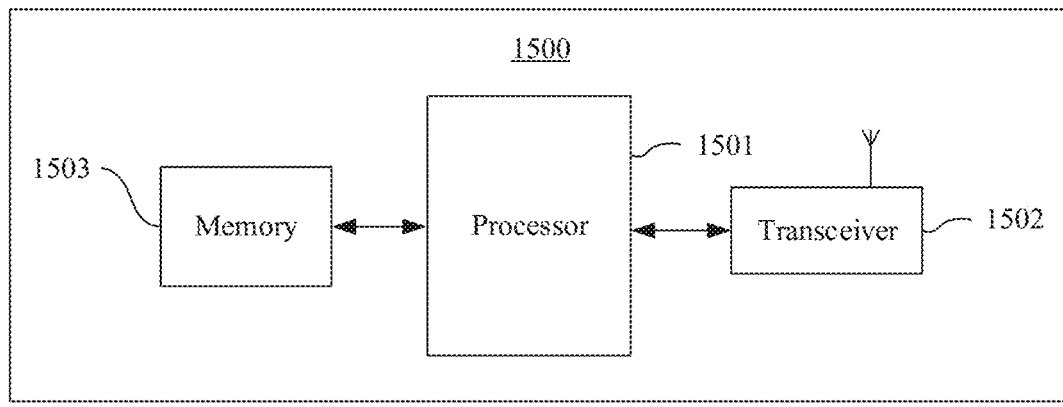
FIG. 15 is a schematic structural diagram of a communications device according to an embodiment of this application.

FIG. 15 is a schematic structural diagram of a communications device according to an embodiment of this application.

Referring to FIG. 15, the communications device 1500 includes a processor 1501 and a transceiver 1502.

The processor 1501 is configured to determine a preamble, where the preamble includes M symbol groups, where M is a positive integer greater than 1.

The transceiver 1502 is configured to send the M symbol groups in K uplink subframe sets, where any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

The communications device 1500 may further include a memory 1503. The memory 1503 may be configured to store a program/code pre-installed when the communications device 1500 is at delivery, or may store program code that includes a computer operation instruction and that is executed by the processor 1501, or the like. The memory 1503 may include a volatile memory, for example, a random access memory (RAM). The memory may further include a non-volatile memory, for example, a flash memory, a hard disk drive (HDD), or a solid-state drive (SSD).

Optionally, M is equal to 6.

K is equal to 2, and each of the two uplink subframe sets is used to send three symbol groups.

Optionally, the K uplink subframe sets include a first uplink subframe set and a second uplink subframe set.

The transceiver 1502 is specifically configured to:

receive a first symbol group, a second symbol group, and a third symbol group in the M symbol groups in the first uplink subframe set; and receive a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The transceiver 1502 is specifically configured to:

send a first symbol group and a second symbol group in the M symbol groups in the first uplink subframe set; and send a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

Based on a same technical concept, the embodiments of this application further provide a communications device. The communications device may perform step 203 and step 204 in the procedure shown in FIG. 2, and content related to step 203 and step 204.

Figure 16:
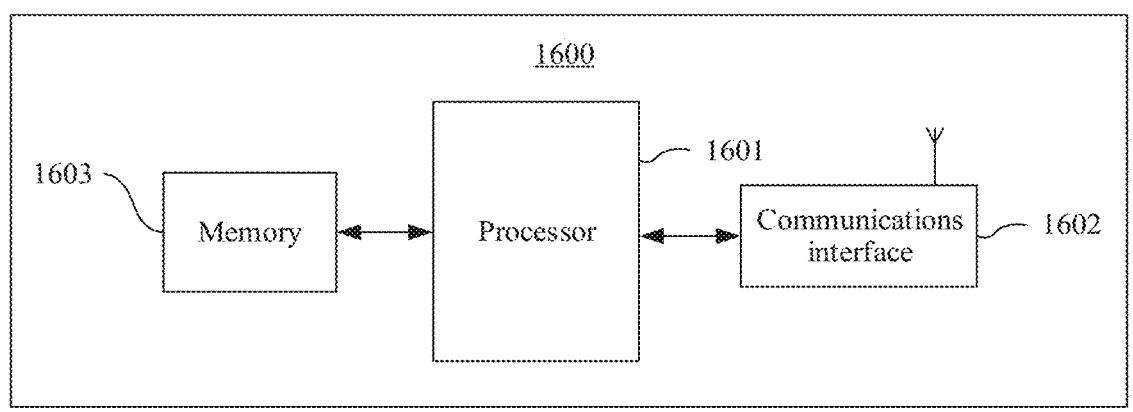
FIG. 16 is a schematic structural diagram of a communications device according to an embodiment of this application.

FIG. 16 is a schematic structural diagram of a communications device according to an embodiment of this application.

Referring to FIG. 16, the communications device 1600 includes a processor 1601 and a communications interface 1602.

The communications interface 1602 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface.

The communications interface 1602 is configured to receive a preamble sent by a terminal device in K uplink subframe sets, where the preamble includes M symbol groups: any uplink subframe set in the K uplink subframe sets includes at least one consecutive uplink subframe, any two uplink subframe sets in the K uplink subframe sets are spaced by at least one downlink subframe, and in each of the K uplink subframe sets at least one symbol group can be sent, where K is a positive integer greater than 1, M is a positive integer greater than 1, and K is less than or equal to M; and N times of frequency hopping exist in the M symbol groups, each of the N times of frequency hopping is frequency hopping between adjacent symbol groups in the M symbol groups, and frequency hopping directions of at least two of the N times of frequency hopping are opposite, where N is less than M.

The processor 1601 is configured to perform uplink synchronization measurement based on the preamble.

The communications device 1600 may further include a memory 1603. The memory 1603 may be configured to store a program/code pre-installed when the communications device 1600 is at delivery, or may store program code that includes a computer operation instruction and that is executed by the processor 1601, or the like.

Optionally, M is equal to 6.

K is equal to 2, and each of the two uplink subframe sets is used to send three symbol groups.

Optionally, the K uplink subframe sets include a first uplink subframe set and a second uplink subframe set.

The communications interface 1602 is specifically configured to:

receive a first symbol group, a second symbol group, and a third symbol group in the M symbol groups in the first uplink subframe set; and receive a fourth symbol group, a fifth symbol group, and a sixth symbol group in the M symbol groups in the second uplink subframe set, where a frequency hopping interval between the first symbol group and the second symbol group is the same as a frequency hopping interval between the second symbol group and the third symbol group; and a frequency hopping direction between the first symbol group and the second symbol group is opposite to a frequency hopping direction between the second symbol group and the third symbol group; and a frequency hopping interval between the fourth symbol group and the fifth symbol group is the same as a frequency hopping interval between the fifth symbol group and the sixth symbol group; and a frequency hopping direction between the fourth symbol group and the fifth symbol group is opposite to a frequency hopping direction between the fifth symbol group and the sixth symbol group.

Optionally, the frequency hopping interval between the first symbol group and the second symbol group is less than the frequency hopping interval between the fourth symbol group and the fifth symbol group.

Optionally, M is equal to 4.

K is equal to 2, and each of the two uplink subframe sets is used to send two symbol groups.

Optionally, the K uplink subframe sets include a first uplink subframe set and a second uplink subframe set.

The communications interface 1602 is specifically configured to:

receive a first symbol group and a second symbol group in the M symbol groups in the first uplink subframe set; and receive a third symbol group and a fourth symbol group in the M symbol groups in the second uplink subframe set, where a frequency hopping direction between the first symbol group and the second symbol group is opposite to a frequency hopping direction between the third symbol group and the fourth symbol group; and a frequency hopping interval between the first symbol group and the second symbol group is different from a frequency hopping interval between the third symbol group and the fourth symbol group.

Optionally, the frequency hopping interval between the first symbol group and the second symbol group is less than the frequency hopping interval between the third symbol group and the fourth symbol group.

An embodiment of this application further provides a computer-readable storage medium, configured to store a computer software instruction that needs to be executed by the foregoing processor. The computer software instruction includes a program that needs to be executed by the foregoing processor.

For related parts between the method embodiments of this application, refer to each other. The apparatus provided in each apparatus embodiment is configured to perform the method provided in the corresponding method embodiment. Therefore, each apparatus embodiment may be understood with reference to a related part in a related method embodiment.

A person of ordinary skill in the art may understand that all or some of the steps in the methods implementing the foregoing embodiments may be completed by a program instructing related hardware. The program may be stored in a readable storage medium in a device. When the program is run, the program executes all or some of the steps described above. The storage medium is, for example, a magnetic disk storage or an optical storage.

In the foregoing specific implementation manners, the objective, technical solutions, and benefits of this application are further described in detail. It should be understood that different embodiments can be combined. The foregoing descriptions are merely specific implementation manners of this application, but are not intended to limit the protection scope of this application. Any combination, modification, equivalent replacement, or improvement made without departing from the spirit and principle of this application should fall within the protection scope of this application.

What is claimed is:

1. A communication method, comprising:
    determining, by a terminal device, a preamble, wherein the preamble comprises six symbol groups; and sending, by the terminal device, the six symbol groups in two uplink subframe sets, wherein each uplink subframe set in the two uplink subframe sets comprises one uplink subframe or more than one consecutive uplink subframes, the two uplink subframe sets are spaced by at least one downlink subframe, and at least one symbol group in each of the two uplink subframe sets is capable of being sent; and N times of frequency hopping exist in the six symbol groups, each of the N times of frequency hopping is a frequency hopping between adjacent symbol groups in the six symbol groups, and frequency hopping directions of at least two of the N times of frequency hopping are opposite, wherein N is less than six, wherein the terminal device sends three symbol groups in each of the two uplink subframe sets, wherein the two uplink subframe sets comprise a first uplink subframe set and a second uplink subframe set, wherein sending the six symbol groups in the two uplink subframe sets comprises:

sending, by the terminal device, a first symbol group, a second symbol group, and a third symbol group in the six symbol groups in the first uplink subframe set; and sending, by the terminal device, a fourth symbol group, a fifth symbol group, and a sixth symbol group in the six symbol groups in the second uplink subframe set, wherein a frequency hopping interval between the first symbol group and the second symbol group is same as a frequency hopping interval between the second symbol group and the third symbol group, wherein a frequency hopping direction between the first symbol group and the second symbol group is opposite to a frequency hopping direction between the second symbol group and the third symbol group, and wherein a frequency hopping interval between the fourth symbol group and the fifth symbol group is same as a frequency hopping interval between the fifth symbol group and the sixth symbol group, and wherein a frequency hopping direction between the fourth symbol group and the fifth symbol group is opposite to a frequency hopping direction between the fifth symbol group and the sixth symbol group.

2. The method according to claim 1, wherein the frequency hopping interval between the first symbol group and the second symbol group is less than the frequency hopping interval between the fourth symbol group and the fifth symbol group.

3. A communication method, comprising:

receiving, by a network device, a preamble from a terminal device in two uplink subframe sets, wherein the preamble comprises six symbol groups; each uplink subframe set in the two uplink subframe sets comprises one uplink subframe or more than one consecutive uplink subframes, the two uplink subframe sets are spaced by at least one downlink subframe, and at least one symbol group in each of the two uplink subframe sets is capable of being sent; and N times of frequency hopping exist in the six symbol groups, each of the N times of frequency hopping is a frequency hopping between adjacent symbol groups in the six symbol groups, and frequency hopping directions of at least two of the N times of frequency hopping are opposite, wherein N is less than six; and performing, by the network device, uplink synchronization measurement based on the preamble, wherein each of the two uplink subframe sets is used to send three symbol groups, wherein the two uplink subframe sets comprise a first uplink subframe set and a second uplink subframe set, wherein receiving the preamble from the terminal device in the two uplink subframe sets comprises:

receiving, by the network device, a first symbol group, a second symbol group, and a third symbol group in the six symbol groups in the first uplink subframe set; and receiving a fourth symbol group, a fifth symbol group, and a sixth symbol group in the six symbol groups in the second uplink subframe set, wherein a frequency hopping interval between the first symbol group and the second symbol group is same as a frequency hopping interval between the second symbol group and the third symbol group, wherein a frequency hopping direction between the first symbol group and the second symbol group is opposite to a frequency hopping direction between the second symbol group and the third symbol group, wherein a frequency hopping interval between the fourth symbol group and the fifth symbol group is same as a frequency hopping interval between the fifth symbol group and the sixth symbol group, and wherein a frequency hopping direction between the fourth symbol group and the fifth symbol group is opposite to a frequency hopping direction between the fifth symbol group and the sixth symbol group.

4. The method according to claim 3, wherein the frequency hopping interval between the first symbol group and the second symbol group is less than the frequency hopping interval between the fourth symbol group and the fifth symbol group.

5. A communications device, comprising at least one processor, a transceiver, and a non-transitory computer-readable storage medium coupled to the at least one processor and storing programming instructions for execution by the at least one processor, the programming instructions instruct the at least one processor to perform operations comprising:

determining a preamble, wherein the preamble comprises six symbol groups; and sending, through the transceiver, the six symbol groups in two uplink subframe sets, wherein each uplink subframe set in the two uplink subframe sets comprises one uplink subframe or more than one consecutive uplink subframes, the two uplink subframe sets are spaced by at least one downlink subframe, and at least one symbol group in each of the two uplink subframe sets is capable of being sent; and N times of frequency hopping exist in the six symbol groups, each of the N times of frequency hopping is a frequency hopping between adjacent symbol groups in the six symbol groups, and frequency hopping directions of at least two of the N times of frequency hopping are opposite, wherein N is less than six, wherein three symbol groups is sent in each of the two uplink subframe sets, wherein the two uplink subframe sets comprise a first uplink subframe set and a second uplink subframe set, and wherein sending the six symbol groups in the two uplink subframe sets comprises:

sending a first symbol group, a second symbol group, and a third symbol group in the six symbol groups in the first uplink subframe set; and sending a fourth symbol group, a fifth symbol group, and a sixth symbol group in the six symbol groups in the second uplink subframe set, wherein a frequency hopping interval between the first symbol group and the second symbol group is same as a frequency hopping interval between the second symbol group and the third symbol group, wherein a frequency hopping direction between the first symbol group and the second symbol group is opposite to a frequency hopping direction between the second symbol group and the third symbol group, and wherein a frequency hopping interval between the fourth symbol group and the fifth symbol group is same as a frequency hopping interval between the fifth symbol group and the sixth symbol group, and wherein a frequency hopping direction between the fourth symbol group and the fifth symbol group is opposite to a frequency hopping direction between the fifth symbol group and the sixth symbol group.

6. The communications device according to claim 5, wherein the frequency hopping interval between the first symbol group and the second symbol group is less than the frequency hopping interval between the fourth symbol group and the fifth symbol group.

7. A communications device, comprising at least one processor, a transceiver, and a non-transitory computer-readable storage medium coupled to the at least one processor and storing programming instructions for execution by the at least one processor, the programming instructions instruct the at least one processor to perform operations comprising:

receiving, through the transceiver, a preamble from a terminal device in two uplink subframe sets, wherein the preamble comprises six symbol groups; each uplink subframe set in the two uplink subframe sets comprises one uplink subframe or more than one consecutive uplink subframes, the two uplink subframe sets are spaced by at least one downlink subframe, and at least one symbol group in each of the two uplink subframe sets is capable of being sent; and N times of frequency hopping exist in the six symbol groups, each of the N times of frequency hopping is a frequency hopping between adjacent symbol groups in the six symbol groups, and frequency hopping directions of at least two of the N times of frequency hopping are opposite, wherein N is less than six; and performing uplink synchronization measurement based on the preamble, wherein three symbol groups are sent in each of the two uplink subframe sets, wherein the two uplink subframe sets comprise a first uplink subframe set and a second uplink subframe set, and wherein receiving the preamble from the terminal device in the two uplink subframe sets comprises:

receiving, by the network device, a first symbol group, a second symbol group, and a third symbol group in the six symbol groups in the first uplink subframe set; and receiving a fourth symbol group, a fifth symbol group, and a sixth symbol group in the six symbol groups in the second uplink subframe set, wherein a frequency hopping interval between the first symbol group and the second symbol group is same as a frequency hopping interval between the second symbol group and the third symbol group, wherein a frequency hopping direction between the first symbol group and the second symbol group is opposite to a frequency hopping direction between the second symbol group and the third symbol group, wherein a frequency hopping interval between the fourth symbol group and the fifth symbol group is same as a frequency hopping interval between the fifth symbol group and the sixth symbol group, and wherein a frequency hopping direction between the fourth symbol group and the fifth symbol group is opposite to a frequency hopping direction between the fifth symbol group and the sixth symbol group.

8. The communications device according to claim 7, wherein the frequency hopping interval between the first symbol group and the second symbol group is less than the frequency hopping interval between the fourth symbol group and the fifth symbol group.

* * * * *